(12) United States Patent
Babu et al.

(10) Patent No.: US 12,472,197 B2
(45) Date of Patent: Nov. 18, 2025

(54) METHODS, COMPOSITIONS, AND DOSING REGIMENS FOR TREATMENT OF SARS-CoV-2 INFECTIONS

(71) Applicant: Island Pharmaceuticals, Ltd., Camberwell (AU)

(72) Inventors: Yarlagadda S. Babu, Birmingham, AL (US); Amanda Mathis, Raleigh, NC (US); William P. Sheridan, Durham, NC (US)

(73) Assignee: Island Pharmaceuticals, Ltd., Melbourne (AU)

( * ) Notice: Subject to any disclaimer, the term of this patent is extended or adjusted under 35 U.S.C. 154(b) by 467 days.

(21) Appl. No.: 17/995,793

(22) PCT Filed: Apr. 7, 2021

(86) PCT No.: PCT/US2021/026222
§ 371 (c)(1),
(2) Date: Oct. 7, 2022

(87) PCT Pub. No.: WO2021/207386
PCT Pub. Date: Oct. 14, 2021

(65) Prior Publication Data
US 2023/0158054 A1    May 25, 2023

Related U.S. Application Data

(60) Provisional application No. 63/006,186, filed on Apr. 7, 2020.

(51) Int. Cl.
*A61K 31/7064* (2006.01)
*A61P 31/14* (2006.01)

(52) U.S. Cl.
CPC .......... *A61K 31/7064* (2013.01); *A61P 31/14* (2018.01)

(58) Field of Classification Search
None
See application file for complete search history.

(56) References Cited

U.S. PATENT DOCUMENTS 9,492,452 B2    11/2016    Bantia et al.

FOREIGN PATENT DOCUMENTS

| WO | 2013158746 A1 | 10/2013 |
| WO | 2016069826 A1 | 5/2016 |

OTHER PUBLICATIONS

Ko WC, Rolain JM, Lee NY, Chen PL, Huang CT, Lee PI, Hsueh PR. Arguments in favour of remdesivir for treating SARS-CoV-2 infections. International journal of antimicrobial agents. Apr. 1, 2020;55(4):105933.*

Yao, et al., "In Vitro Antiviral Activity and Projections of Optimized Dosing Design of Hydroxychloroquine for the Treatment of Severe Acute Repiratory Syndrome Coronavirus 2 (SARS-CoV-2)," Clinical Infectious Disease, Mar. 9, 2020, pp. 732-739, vol. 71.

* cited by examiner

*Primary Examiner* — Patrick T Lewis
(74) *Attorney, Agent, or Firm* — Nicholas J. Landau; Maynard Nexsen PC

(57) ABSTRACT

Provided are compounds of the formula I and pharmaceutically acceptable salts, solvates, and hydrates thereof, for use in treating or suppressing a SARS-CoV-2 infection in a subject. A novel dosing regimen for administration of the disclosed compounds is also provided comprising administering at least one loading dose and at least one maintenance dose of the disclosed compound. The compounds of the disclosure are characterized, in part, by favorable pharmacokinetics for the active pharmaceutical ingredient, particularly in conjunction with the dosing regimen described.

32 Claims, 5 Drawing Sheets

METHODS, COMPOSITIONS, AND DOSING REGIMENS FOR TREATMENT OF SARS-CoV-2 INFECTIONS

BACKGROUND

Viral diseases are responsible for both global pandemics, such as COVID-19, and yearly seasonal epidemics such as influenza. Outbreaks may be characterized by potentiated virulence and may occur suddenly, resulting in serious morbidity and/or mortality. Importantly, viral diseases are not limited to humans. For example, influenza also affects livestock and birds, which may have significant impact on food supply in addition to increasing the risk of transmission to humans.

The emergence of a novel coronavirus, named Severe Acute Respiratory Syndrome Coronavirus 2 (SARS-CoV-2, formerly 2019-nCoV), initiated a global effort to identify effective treatments. Unlike infections with bacteria, relatively few agents are effective for the prevention and treatment of viral infections. The biology of viral diseases has been partially deduced, including viral genome transcription, translation, and replication. In RNA-containing viruses an important enzyme is RNA-dependent RNA polymerase, which is responsible for viral genome replication. RNA-dependent RNA polymerase is an essential protein encoded in the genomes of all RNA-containing viruses with no DNA stage. Because replication of the virus is dependent on RNA polymerase, this enzyme is a promising target in the development of new anti-viral compounds.

Few antiviral drugs for managing infections with human coronaviruses have been approved, posing a serious challenge to current global efforts aimed at containing the outbreak SARS-CoV-2. Due to the high infectivity of SARS-CoV-2 and the significant morbidity and mortality caused by SARS-CoV-2 infection, the art is in need for effective treatments for SARS-CoV-2 infections. In addition to identifying a suitable compound that is effective against SARS-CoV-2, the dosing regimen of such compounds must also be carefully selected so that the pharmacokinetic and pharmacodynamic properties of the compounds are maximized.

The present disclosure provides a solution to the needs of the art by providing compounds useful in the treatment of SARS-CoV-2 infection along with an optimized dosing regimen for administration of the described compounds.

SUMMARY OF THE DISCLOSURE

Figure 1A:
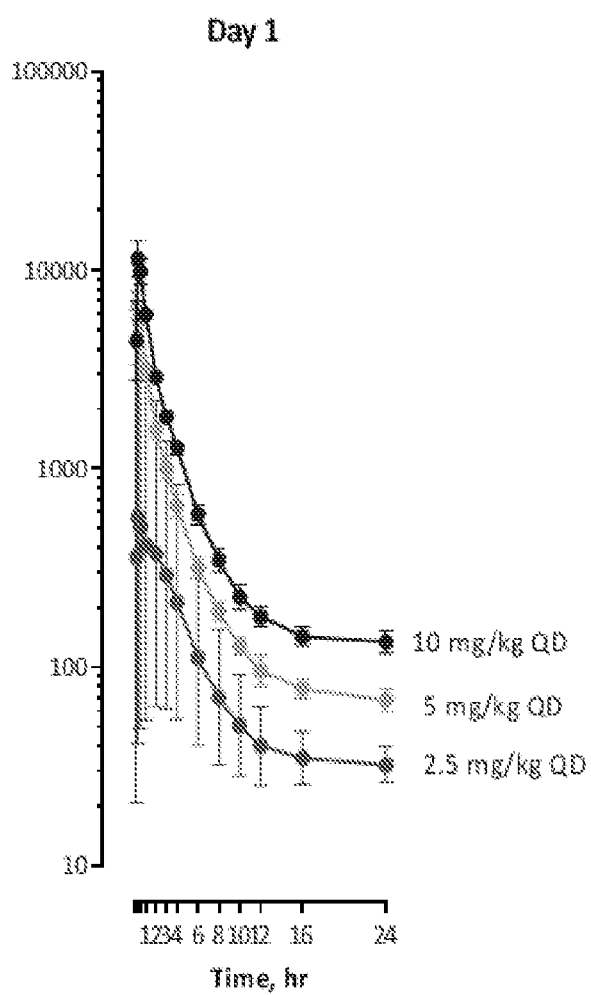
FIG. 1A shows the plasma PK profile of Compound A administered to human subjects by IM injection following the first dose of Compound A on day 1 (results expressed as ng/ml Compound A).

The disclosure provides compounds of Formula I, including pharmaceutically acceptable salts thereof, for use in treating or suppressing a SARS-CoV-2 infection in a subject, for use in inhibiting SARS-CoV-2 RNA polymerase activity in a subject, and/or for use in inhibiting SARS-CoV-2 replication in a subject. The disclosure further provides a novel dosing regimen for administration of the compounds of Formula I to a subject comprising administering at least one loading dose and at least one maintenance dose of a compound of Formula I. The compounds of the disclosure are characterized, in part, by favorable pharmacokinetics for the active pharmaceutical ingredient, particularly in conjunction with the dosing regimen described. The disclosure also provides pharmaceutical compositions comprising one or more compounds of Formula I, or pharmaceutically acceptable salts thereof, as well as methods for preparing same. The disclosure further provides and methods for treating a SARS-CoV-2 infection in a subject, particularly using the dosing regimens described, methods for suppressing a SARS-CoV2 infection ins a subject, particularly using the dosing regimens described, methods for inhibiting SARS-CoV-2 viral RNA polymerase activity in a subject and methods for inhibiting SARS-CoV-2 replication in a subject.

DETAILED DESCRIPTION

SARS-CoV-2 is an enveloped single-stranded ribonucleic acid (RNA) virus and is the causative agent of coronavirus diseases 2019 (COVID-19). There are 4 known endemic human coronaviruses that can cause mild respiratory infections, and two previously described epidemic coronaviruses that have caused outbreaks: severe acute respiratory syndrome coronavirus (SARS-CoV) in 2002, and Middle East respiratory syndrome coronavirus (MERS-CoV) in 2012. In December 2019, an outbreak of a new coronavirus respiratory disease syndrome (subsequently named COVID-19) was first described in Wuhan, China and was identified to be caused by a novel coronavirus that was subsequently named SARS-CoV-2.

SARS-CoV-2 is highly transmissible person-to-person with an estimated basic reproduction number ($R_0$) of 2-3.5. Transmission is believed to occur primarily via respiratory droplets and to a lesser extent via contact with contaminated surfaces. The disease has an average incubation (asymptomatic) period of 5 days (range 2-14) after exposure, and viral replication in the respiratory tract may result in transmission to others even before the onset of symptomatic disease. Rapid modes of travel have helped to quickly spread COVID-19 globally. On Mar. 11, 2020 the WHO declared COVID-19 to be a pandemic.

COVID-19 is characterized by a variety of symptoms common to a lower respiratory tract viral infection, including, but not limited to: fever, fatigue/malaise/myalgia, non-productive cough, dyspnea, and hypoxemia. Chest imaging changes consistent with a viral-type pneumonitis are common. Frequently observed laboratory abnormalities have included lymphopenia, mild increase in neutrophils, mild elevations of liver transaminases (typically <3 times the upper limit of normal), elevated D-dimer, and elevated lactate dehydrogenase in patients with severe viral pneumonitis. Approximately 80% of cases are mild-to-moderate (often manageable without hospitalization), 15% are severe, and 5% are critical (characterized by symptoms such as, but not limited to, respiratory failure and acute respiratory distress syndrome [ARDS] requiring mechanical ventilation or extracorporeal membrane oxygenation, shock, and multi-organ failure). The overall case fatality rate is estimated to be 1-3%; however, the risk of a fatal outcome is lowest in patients less than 50 years old and rises with increasing age and comorbidities including pulmonary disease, cardiovascular disease, diabetes mellitus, and other debilitating and immunocompromising conditions. Secondary bacterial superinfections may occur in the more severe cases and may lead to sepsis syndrome.

The compounds of the disclosure are inhibitors of viral RNA polymerase activity and inhibit viral RNA polymerase activity through non-obligate RNA chain termination, a mechanism requiring anabolism of the parent compound to a triphosphate form. After pyrophosphate cleavage of the triphosphate, incorporation of the compounds as a monophosphate into nascent viral RNA strands causes premature termination of transcription and replication of viral RNA. Findings from primer-extension reactions suggest that termination occurs two bases after incorporation, perhaps as a result of inhibitory stereochemical distortions of the nascent RNA chain.

Compounds of the disclosure have been shown to exhibit anti-viral effects in vitro in cells infected with a wide range of negative-sense and positive-sense RNA viruses, including SARS-CoV and MERS-CoV. As such compounds of the disclosure have the potential to be used as effective treatments for SARS-CoV-2 infection in subjects, including human subjects, providing that an effective dosage regimen can be identified that provides favorable pharmacokinetics for the compounds of the disclosure when administered to said subjects.

Provided herein are novel dosing regimens for administration of the compounds of the disclosure to a subject. The described dosing regimens comprise administering at least one loading dose and at least one maintenance dose to a subject having a SARS-CoV-2 infection or to a subject suspected of having a SARS-CoV-2 infection. Methods for inhibiting SARS-CoV-2 viral RNA polymerase activity, methods for inhibiting SARS-CoV-2 replication, and methods for treating and/or suppressing a SARS-CoV-2 infection in a subject, particularly using the dosing regimens described, are also disclosed.

Definitions

The term "acid" contemplates all pharmaceutically acceptable inorganic or organic acids. Inorganic acids include mineral acids such as hydrohalic acids, such as hydrobromic and hydrochloric acids, sulfuric acids, phosphoric acids and nitric acids. Organic acids include all pharmaceutically acceptable aliphatic, alicyclic and aromatic carboxylic acids, dicarboxylic acids, tricarboxylic acids, and fatty acids. Preferred acids are straight chain or branched, saturated or unsaturated C1-C20 aliphatic carboxylic acids, which are optionally substituted by halogen or by hydroxyl groups, or C6-C12 aromatic carboxylic acids. Examples of such acids are carbonic acid, formic acid, fumaric acid, acetic acid, propionic acid, isopropionic acid, valeric acid, alpha-hydroxy acids, such as glycolic acid and lactic acid, chloroacetic acid, benzoic acid, methane sulfonic acid, and salicylic acid. Examples of dicarboxylic acids include oxalic acid, malic acid, succinic acid, tataric acid and maleic acid. An example of a tricarboxylic acid is citric acid. Fatty acids include all pharmaceutically acceptable saturated or unsaturated aliphatic or aromatic carboxylic acids having 4 to 24 carbon atoms. Examples include butyric acid, isobutyric acid, sec-butyric acid, lauric acid, palmitic acid, stearic acid, oleic acid, linoleic acid, linolenic acid, and phenylsteric acid. Other acids include gluconic acid, glycoheptonic acid and lactobionic acid.

The term "bodily fluid(s)" as used herein means an aerosol, a fluid or secretion produced by the body, including, but not limited to, blood, blood plasma, blood serum, aerosols (such as from a cough or a sneeze), mucous, cerebrospinal fluid, urine, saliva, tears, sputum, amniotic fluid, breast milk, semen, seminal fluid, or vaginal secretions (or a combination of the foregoing). In a particular embodiment, the term refers to an aerosol (such as from a cough or a sneeze).

The term "carrier" refers to a pharmaceutically acceptable diluent, excipient, adjuvant, excipient, or vehicle with which a compound of the disclosure is administered. Non-limiting examples of such carriers include, but are not limited to, liquids, such as, but are not limited to, water, saline, and oils, including, but are not limited to, oils of petroleum, animal, vegetable or synthetic origin, such as, but are not limited to, peanut oil, soybean oil, mineral oil, and sesame oil, gum acacia, gelatin, starch paste, talc, keratin, colloidal silica, urea, and the like. In addition, auxiliary, stabilizing, thickening, lubricating and coloring agents may be used. Other examples of suitable carriers are described in "Remington's Pharmaceutical Sciences" by E. W. Martin.

The term "compound(s) of the disclosure" as used herein means a compound of formula I, including pharmaceutically acceptable salts, tautomeric forms, hydrates and/or solvates thereof. In certain embodiments, a compound of the disclosure is Compound A.

The term "Compound A" as used herein means a compound of formula I where A is $NH_2$ and B is H, including pharmaceutically acceptable salts, tautomeric forms, hydrates and/or solvates thereof.

The term an "effective amount," "sufficient amount" or "therapeutically effective amount" as used herein is an amount of a compound of the disclosure that is sufficient to achieve a beneficial or desired result, including clinical results. As such, the "effective amount," "sufficient amount" or "therapeutically effective amount" may be sufficient, for example, to reduce or ameliorate the severity and/or duration of a SARS-CoV-2 infection, or one or more symptoms thereof, reduce the recurrence, development, or onset of one or more symptoms associated with a SARS-CoV-2 infection, reduce the replication or multiplication of SARS-CoV-2, reduce the production and/or release of SARS-CoV-2 viral particles, or enhance or otherwise improve the prophylactic or therapeutic effect(s) of another therapy. In certain embodiments, an "effective amount," "sufficient amount" or "therapeutically effective amount" is an amount of a compound of the disclosure that avoids or substantially attenuates undesirable side effects.

In certain embodiments, the "effective amount," "sufficient amount" or "therapeutically effective amount" in the context of a SARS-CoV-2 infection is an amount sufficient to reduce one or more of the following steps of a the life cycle of SARS-CoV-2: the docking of the virus particle to a cell, the introduction of viral genetic information into a cell, the expression of viral proteins, the translation of viral RNA, the transcription of viral RNA, the replication of viral RNA, the synthesis of new viral RNA, the production of new virus particles and the release of virus particles from a cell. Such a reduction in any of the foregoing may be by at least 5%, preferably at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 98% or greater. In some embodiments, the "effective amount," "sufficient amount" or "therapeutically effective amount" in the context of a SARS-CoV-2 infection reduces the replication, multiplication or spread of the virus by at least 5%, preferably at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 98% or greater. In some embodiments, the "effective amount," "sufficient amount" or "therapeutically effective amount" in the context of a SARS-CoV-2 infection increases the survival rate of infected subjects by at least 5%, preferably at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 98% or greater. In each of the foregoing, when a reduction of increase is specified, such reduction of increase may be determined with respect to a subject that has not been treated with a compound of the disclosure and that has a diagnosed SARS-CoV-2 infection.

The term "excipient" as used herein means a substance formulated alongside the active ingredient of a medication included for purposes such as, but not limited to, long-term stabilization, bulking up solid formulations that contain potent active ingredients in small amounts (thus often referred to as bulking agents, fillers, or diluents), or to confer a therapeutic enhancement of the active ingredient in the final dosage form, such as facilitating drug absorption, reducing viscosity, or enhancing solubility. Excipients can also be useful in the manufacturing process, to aid in the handling of the active substance concerns such as by facilitating powder flowability or non-stick properties, in addition to aiding in vitro stability such as prevention of denaturation or aggregation over the expected shelf life.

The term "pharmaceutically acceptable" refers to a substance that is compatible with the other ingredients of a composition and not deleterious to the subject. In some embodiments, the term "pharmaceutically acceptable" means approved by a regulatory agency of the Federal or a state government or listed in the U.S. Pharmacopeia or other generally recognized pharmacopeia for use in animals, and more particularly in humans.

The term "pharmaceutically acceptable salt" as used herein is intended to include salts derived acids, including from inorganic or organic acids, including, for example hydrochloric, hydrobromic, sulfuric, nitric, perchloric, phosphoric, formic, acetic, lactic, maleic, fumaric, succinic, tartaric, glycolic, salicylic, citric, methanesulfonic, benzenesulfonic, benzoic, malonic, trifluoroacetic, trichloroacetic, naphthalene-2 sulfonic and other acids. Pharmaceutically acceptable salt forms may also include forms wherein the ratio of molecules comprising the salt is not 1:1. For example, the salt may comprise more than one inorganic or organic acid molecule per molecule of base, such as two hydrochloric acid molecules per molecule of compound of formula I. As another example, the salt may comprise less than one inorganic or organic acid molecule per molecule of base, such as two molecules of compound of formula I per molecule of tartaric acid. Salts may also exist as solvates or hydrates.

A "pharmaceutical composition" refers to a mixture of a compound of the disclosure, with other components, such as, but not limited to, pharmaceutically acceptable carriers. The purpose of a pharmaceutical composition is to facilitate administration of a compound of disclosure.

The term "solvate" as used herein means a compound of the disclosure, or a pharmaceutically acceptable salt thereof, wherein one or more molecules of a suitable solvent are incorporated in the crystal lattice. A suitable solvent is physiologically tolerable at the dosage administered. Examples of suitable solvents are ethanol, water and the like. When water is the solvent, the molecule is referred to as a "hydrate."

The terms "subject" and "patient" as used herein include all members of the animal kingdom including, but not limited to, mammals, animals (e.g., cats, dogs, horses, swine, etc.) and humans. In certain embodiments, the subject is a human. In certain embodiments, the subject is a human of the female sex. In certain embodiments, the subject is a human of the male sex.

The term "tissue" as used herein refers to an organ, part of an organ, cellular structure(s), and/or group of cells in the body of a subject. Including; but not limited to, lung, an embryo, a fetus, placenta, liver, kidney, spleen, brain, testis, or uterus.

The terms "treatment" or "treating" as used herein means an approach for obtaining beneficial or desired results, including clinical results. Beneficial or desired clinical results in the context of a SARS-CoV-2 infection include, but are not limited to, to reducing or ameliorating the severity and/or duration of a SARS-CoV-2 infection, or one or more symptoms thereof, reduing the recurrence, development, or onset of one or more symptoms associated with a SARS-CoV-2 infection, reducing the replication or multiplication of SARS-CoV-2, reducing the production and/or release of SARS-CoV-2 viral particles, or enhancing or otherwise improving the prophylactic or therapeutic effect (s) of another therapy. "Treatment" or "treating" can also mean prolonging survival as compared to expected survival if not receiving treatment.

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Compounds of the Disclosure

The compounds of the disclosure are 9-deazaadenine derivatives generally known as immucillins, the syntheses of which are described, for example, in WO 03/80620, and by Evans et al., in Tetrahedron 2000, 56, 3053 and J. Org. Chem. 2001, 66(17), 5723. Syntheses of similar structures are discussed, for example, in U.S. Pat. Nos. 5,985,848; 6,066,722; 6,228,741 and PCT publications WO 2003/080620 and 2008/030119.

The compounds of the disclosure may exhibit tautomeric properties. Thus, the compounds of the disclosure also encompass tautomeric forms of compounds of formula I, and mixtures thereof. It will further be appreciated that some compounds exist as pharmaceutically acceptable salts, solvates, and/or hydrates, each of which are also within the description of a compound of the disclosure.

The compounds of the disclosure are represented by formula (I):

(I)

[Chemical structure showing a pyrrolopyrimidine nucleoside with substituents A and B, HO-CH2 group, and OH OH groups on the sugar]

or a pharmaceutically acceptable salt, solvate or hydrate thereof, wherein A is OH or $NH_2$, and B is H or $NH_2$.

Thus, in some embodiments of the compound of formula (I), A is $NH_2$. In some embodiments of the compound of formula (I), B is $NH_2$. In some embodiments of the compound of formula (I), A is OH. In some embodiments of the compound of formula (I), B is H. In some embodiments of the compound of formula (I), A is $NH_2$ and B is H. In some embodiments of the compound of formula (I), A is OH and B is $NH_2$. In some embodiments of the compound of formula (I), A is $NH_2$ and B is $NH_2$. In some embodiments of the compound of formula (I), A is OH and B is H. In a particularly preferred embodiment of the compound of formula (I), A is $NH_2$ and B is H.

The synthesis of compounds of the formula I, including Compound A, are known in the art and described, for example in PCT/US2011/056421. The compounds of the disclosure may be prepared in different forms, such as pharmaceutically acceptable salts, hydrates, solvates, or complexes. In some embodiments, the compounds of the disclosure are prepared as pharmaceutically acceptable salts.

In some embodiments, the pharmaceutically acceptable salt has a ratio of about 1:1 acid to compound of the disclosure. In some embodiments, the pharmaceutically acceptable salt has a ratio greater than about 1:1 acid to compound of the disclosure. In some embodiments, the pharmaceutically acceptable salt has a ratio of about 2:1 acid to compound of the disclosure. In some embodiments, the pharmaceutically acceptable salt form exists as a hydrate.

Methods of Use

The compounds of the disclosure are useful to inhibit the SARS-CoV-2 RNA polymerase. As such the compounds of the disclosure may be used to treat or suppress a SARS-CoV-2 infection in a subject, to inhibit the replication or infectivity of SARS-CoV-2 infection in a subject. In some embodiments, the compounds of the disclosure are used to inhibit the expression of viral proteins, the translation of viral RNA, the transcription of viral RNA, the replication of viral RNA, the synthesis of new viral RNA, the production of new virus particles, and/or the release of virus particles from a cell. In some embodiments, the compounds of the disclosure are used to inhibit the growth of a cell infected with a SARS-CoV-2.

In a first aspect, the present disclosure provides a method for treating a subject suffering from a SARS-CoV-2 infection, the method comprising administering to said subject an effective amount of a compound of the disclosure, either alone or as a part of a pharmaceutical composition. In one embodiment of the first aspect, the administering step comprises administering a dose, preferably a plurality of doses, comprising a compound of the disclosure according to a course of treatment. In another embodiment of the first aspect, the administering step comprises intravenously administering a dose, preferably a plurality of doses, comprising a compound of the disclosure according to a course of treatment. In another embodiment of the first aspect, the administering step comprises administering at least one loading dose and a plurality of maintenance doses comprising a compound of the disclosure according to a course of treatment. In another embodiment of the first aspect, the administering step comprises intravenously administering at least one loading dose and a plurality of maintenance doses comprising a compound of the disclosure according to a course of treatment.

In a second aspect, the present disclosure provides a method for suppressing a SARS-CoV-2 infection in a subject, the method comprising administering to the subject an effective amount of a compound of the disclosure, either alone or as a part of a pharmaceutical composition. In one embodiment of the second aspect, the administering step comprises administering a dose, preferably a plurality of doses, comprising a compound of the disclosure according to a course of treatment. In another embodiment of the second aspect, the administering step comprises intravenously administering a dose, preferably a plurality of doses, comprising a compound of the disclosure according to a course of treatment. In another embodiment of the second aspect, the administering step comprises administering at least one loading dose and a plurality of maintenance doses comprising a compound of the disclosure according to a course of treatment. In another embodiment of the second aspect, the administering step comprises intravenously administering at least one loading dose and a plurality of maintenance doses comprising a compound of the disclosure according to a course of treatment.

In a third aspect, the present disclosure provides a method for preventing a SARS-CoV-2 infection in a subject, the method comprising administering to the subject an effective amount of a compound of the disclosure, either alone or as a part of a pharmaceutical composition. In one embodiment of the third aspect, the administering step comprises administering a dose, preferably a plurality of doses, comprising a compound of the disclosure according to a course of treatment. In another embodiment of the third aspect, the administering step comprises intravenously administering a dose, preferably a plurality of doses, comprising a compound of the disclosure according to a course of treatment. In another embodiment of the third aspect, the administering step comprises administering at least one loading dose and a plurality of maintenance doses comprising a compound of the disclosure according to a course of treatment. In another embodiment of the third aspect, the administering step comprises intravenously administering at least one loading dose and a plurality of maintenance doses comprising a compound of the disclosure according to a course of treatment.

In a fourth aspect, the present disclosure provides a method for treating, suppressing and/or preventing a disease or condition related to or associated with a SARS-CoV-2 infection, the method comprising administering to said subject an effective amount of a compound of the disclosure, either alone or as a part of a pharmaceutical composition. In one embodiment of the fourth aspect, the administering step comprises administering a dose, preferably a plurality of doses, comprising a compound of the disclosure according to a course of treatment. In another embodiment of the fourth aspect, the administering step comprises intravenously administering a dose, preferably a plurality of doses, comprising a compound of the disclosure according to a course of treatment. In another embodiment of the fourth aspect, the administering step comprises administering at least one loading dose and a plurality of maintenance doses comprising a compound of the disclosure according to a course of treatment. In another embodiment of the fourth aspect, the administering step comprises intravenously administering at least one loading dose and a plurality of maintenance doses comprising a compound of the disclosure according to a course of treatment.

In a fifth aspect, the present disclosure provides a method for reducing a viral titer of SARS-CoV-2 in a bodily fluid, tissue or cell of a subject suffering from a SARS-CoV-2 infection, the method comprising contacting said fluid, tissue or cell with a compound of the disclosure or administering an effective amount of a compound of the disclosure to the subject, either alone or as a part of a pharmaceutical composition. In certain embodiments, the transmission of SARS-CoV-2 (for example, from a subject infected with SARS-CoV-2 to a subject that is not yet infected) is reduced as a result of the reduced viral titer. In one embodiment of the fifth aspect, the contacting step comprises administering a dose, preferably a plurality of doses, comprising a compound of the disclosure according to a course of treatment. In another embodiment of the fifth aspect, the contacting step comprises intravenously administering a dose, preferably a plurality of doses, comprising a compound of the disclosure according to a course of treatment. In another embodiment of the fifth aspect, the contacting step comprises administering at least one loading dose and a plurality of maintenance doses comprising a compound of the disclosure according to a course of treatment. In another embodiment of the fifth aspect, the contacting step comprises intravenously administering at least one loading dose and a plurality of maintenance doses comprising a compound of the disclosure according to a course of treatment.

In a sixth aspect, the present disclosure provides a method for reducing or preventing the transmission of a SARS-CoV-2 infection, the method comprising administering to a subject an effective amount of a compound of the disclosure, either alone or as a part of a pharmaceutical composition. In one embodiment of the sixth aspect, the administering step comprises administering to the first subject a dose, preferably a plurality of doses, comprising a compound of the disclosure according to a course of treatment. In another embodiment of the sixth aspect, the administering step comprises intravenously administering to the first subject a dose, preferably a plurality of doses, comprising a compound of the disclosure according to a course of treatment. In another embodiment of the sixth aspect, the administering step comprises administering to the first subject at least one loading dose and a plurality of maintenance doses comprising a compound of the disclosure according to a course of treatment. In another embodiment of the sixth aspect, the administering step comprises intravenously administering to the first subject at least one loading dose and a plurality of maintenance doses comprising a compound of the disclosure according to a course of treatment.

In certain embodiments of the sixth aspect, such reduction or prevention is obtained, at least in part, by reducing the viral titer of a SARS-CoV-2 in the first subject. In certain embodiments of the sixth aspect, such reduction or prevention is obtained, at least in part, by preventing or suppressing a SARS-CoV-2 infection in the second subject. In certain embodiments of the sixth aspect, the second subject is a prenatal human (for example, an embryo or a fetus) and the first subject is a caregiver or an expectant parent.

In a seventh aspect, the present disclosure provides a method for reducing or preventing the transmission of a SARS-CoV-2 infection from a first subject to a second subject, the method comprising administering to the one of the first subject or the second subject an effective amount of a compound of the disclosure, either alone or as a part of a pharmaceutical composition. In one embodiment of the seventh aspect, the administering step comprises administering to the first subject a dose, preferably a plurality of doses, comprising a compound of the disclosure according to a course of treatment. In one embodiment of the seventh aspect, the administering step comprises administering to the second subject a dose, preferably a plurality of doses, comprising a compound of the disclosure according to a course of treatment.

In another embodiment of the seventh aspect, the administering step comprises intravenously administering to the first subject a dose, preferably a plurality of doses, comprising a compound of the disclosure according to a course of treatment. In another embodiment of the seventh aspect, the administering step comprises intravenously administering to the second subject a dose, preferably a plurality of doses, comprising a compound of the disclosure according to a course of treatment.

In another embodiment of the seventh aspect, the administering step comprises administering to the first subject at least one loading dose and a plurality of maintenance doses comprising a compound of the disclosure according to a course of treatment. In another embodiment of the seventh aspect, the administering step comprises administering to the second subject at least one loading dose and a plurality of maintenance doses comprising a compound of the disclosure according to a course of treatment.

In another embodiment of the seventh aspect, the administering step comprises intravenously administering to the first subject at least one loading dose and a plurality of maintenance doses comprising a compound of the disclosure according to a course of treatment. In another embodiment of the seventh aspect, the administering step comprises intravenously administering to the second subject at least one loading dose and a plurality of maintenance doses comprising a compound of the disclosure according to a course of treatment.

In certain embodiments of the seventh aspect, the second subject may be at risk for SARS-CoV-2 infection. In certain embodiments of the seventh aspect, such reduction or prevention is obtained, at least in part, by preventing or suppressing a SARS-CoV-2 infection in the second subject. In certain embodiments of the seventh aspect, such reduction or prevention is obtained, at least in part, by reducing the viral titer of a SARS-CoV-2 in the second subject. As a result, if a SARS-CoV-2 infection occurs in the second subject, it can be eliminated physiologically (for example, by the immune system) by the second subject, either with or without the administration of additional therapeutic compounds.

In certain embodiments of the sixth and seventh aspects, the second subject is a family member or acquaintance of the first subject. In certain embodiments of the sixth and seventh aspects, the second subject is an infant or child and the first subject is a caregiver or a parent. In certain embodiments of the sixth and seventh aspects, the first subject is a caregiver or parent and the second subject is an infant or child. In certain embodiments of the sixth and seventh aspects, the second subject is a healthcare worker, a first responder (for example, a policeman or a fireman), a member of the military, or other individual in contact with other people as a part of their daily activities as such subjects undertake activities that place them at a higher risk of SARS-CoV-2 infection. In certain embodiments of the sixth and seventh aspects, the SARS-CoV-2 infection is transmitted from the first subject to the second subject through transmission of an aerosol or a bodily fluid of the first subject to the second subject.

In certain embodiments of the sixth and seventh aspects, the first subject is suspected of having a SARS-CoV-2 infection (for example, the first subject may have travelled to a region where SARS-CoV-2 infections have been documented). In certain embodiments of the sixth and seventh aspects, the first subject has a SARS-CoV-2 infection (including a SARS-CoV-2 infection that cannot be detected by current diagnostic methods at the time). In certain embodiments of the seventh aspect, the compound of the disclosure is administered to the second subject before the first subject has been infected with the SARS-CoV-2 infection, after the first subject has been infected with the SARS-CoV-2 infection, or after the first subject has been infected with the SARS-CoV-2 and before the SARS-CoV-2 infection can be detected.

In an eighth aspect, the present disclosure provides a method of inhibiting a SARS-CoV-2 RNA polymerase, said method comprising contacting the polymerase with a compound of the disclosure.

The methods of the first to seventh aspects may further comprise one or more of the steps: i) identifying a subject in need or treatment; and (ii) providing a compound of the disclosure or a pharmaceutical composition comprising a compound of the disclosure.

In any of the methods of the first to seventh aspects, the viral infection comprises infection by SARS-CoV-2 and by one or more additional viruses.

In any of the methods of the first to seventh aspects, the compound of the disclosure may be administered in an effective amount. Suitable effective amounts are described in more detail herein. In any of the methods of the first to seventh aspects, the administering step may comprise administering a single dose of a compound of the disclosure according to a course of treatment. In any of the methods of the first to seventh aspects, the administering step may comprise administering more than one dose of a compound of the disclosure according to a course of treatment. The amount of a compound of the disclosure in each dose administered during a course of treatment is not required to be the same. For example, in any of the methods of the first to seventh aspects, the administering step may comprise administering at least one loading dose and a plurality of maintenance doses during a course of treatment. Dosing is described in more details herein.

In some embodiments, the disclosure provides for the use of a pharmaceutical composition and/or medicaments comprising an effective amount of a compound of the disclosure in any of the methods described herein.

In any of the methods of the first to seventh aspects, efficacy of the recited methods (i.e., treatment, reduction and/or suppression) results, at least in part, from the inhibition of a SARS-CoV-2 RNA-dependent RNA polymerase. In any of the methods of the first to seventh aspects, efficacy of the recited methods (i.e., treatment, reduction and/or suppression) results, at least in part, from reducing a viral titer of SARS-CoV-2 in a subject.

In any of the methods of the first to seventh aspects, the subject is a mammal. In any of the methods of the first to seventh aspects, the subject is a human. In any of the methods of the first to seventh aspects, the subject is a bat. In any of the methods of the first to seventh aspects, the subject is avian. In any of the methods of the first to seventh aspects, the subject is a swine or pig.

In any of the methods of the first to seventh aspects, the administering step may occur before the subject has been infected with SARS-CoV-2 (i.e., the subject is at risk for infection), after the subject has been infected with SARS-CoV-2 (but before an infection can be detected), or after a subject has been infected with SARS-CoV-2 and the infection can be detected.

In any of the methods of the first to seventh aspects, the subject is a healthcare worker, a first responder (for example, a policeman or a fireman), a member of the military, or other individual in contact with other people as a part of their daily activities as such subjects undertake activities that place them at a higher risk of SARS-CoV-2 infection. In any of the methods of the first to seventh aspects, the subject has travelled to a region where SARS-CoV-2 infections have been documented, the subject has had contact with a person who has travelled to a region where SARS-CoV-2 infections have been documented, the subject has had contact with a person who has a SARS-CoV-2 infection (including a SARS-CoV-2 infection that has not been detected) or is suspected of having a SARS-CoV-2 infection, the subject is a family member or acquaintance of a person who has a SARS-CoV-2 infection (including a SARS-CoV-2 infection that has not been detected) or is at risk of having a SARS-CoV-2 infection, the subject is an infant or child (for example, a subject under the age of 16 years). In any of the methods of the first to seventh aspects, the subject is over the age of 50, over the age of 55, over the age of 60, over the age of 65, over the age of 70, or over the age of 75.

In any of the methods of the first to seventh aspects, the subject may be suffering from pulmonary disease, cardiovascular disease, diabetes mellitus, bacterial superinfection, sepsis syndrome, hypertension, chronic lung disease (inclusive of asthma, chronic obstructive pulmonary disease, and emphysema), chronic renal disease, chronic liver disease, immunocompromised condition, neurologic disorder, neurodevelopmental, or intellectual disability.

In any of the methods of the first to seventh aspects, the subject is administered a first dose of a compound of the disclosure within 1 day, 2 days, 3 days, 4 days, 5 days, 6 days, 7 days, 8 days, 9 days, or 10 days of exhibiting a symptom of SARS-Cov-2 infection.

In any of the methods of the first to seventh aspects, the bodily fluid is blood, blood plasma, blood serum, an aerosol (such as from a cough or a sneeze), mucous, urine, saliva, tears, and/or sputum. In any of the methods of the first to seventh aspects, the compound of the disclosure or pharmaceutical composition comprising a compound of the disclosure is administered intravenously, intraperitoneally, parenterally, intramuscularly or orally. In any of the methods of the first to seventh aspects, the compound of the disclosure or pharmaceutical composition comprising a compound of the disclosure is administered intravenously.

In any of the methods of the first to eighth aspects, a compound of the disclosure is in the form of a pharmaceutically acceptable salt, solvate, or hydrate. A compound the disclosure may be formulated as a pharmaceutically acceptable salt, e.g., acid addition salt, and complexes thereof. The preparation of such salts can facilitate the pharmacological use by altering the physical characteristics of the agent without preventing its physiological effect. Examples of useful alterations in physical properties include, but are not limited to, increasing the solubility to facilitate administering higher concentrations of the drug. In preferred embodiments of the methods of the first to eighth aspects, the compound of the disclosure is Compound A, or a pharmaceutically acceptable salt, hydrate, or solvate thereof.

In preferred embodiments of the methods of the first to seventh aspects, the administering step comprises intravenously administering a single 1 mg/kg to 60 mg/kg loading dose and a plurality of 0.5 mg/kg to 20 mg/kg maintenance doses, each dose comprising a compound of the disclosure or a pharmaceutically acceptable salt, hydrate, or solvate thereof, provided that the loading dose contains a greater amount of the compound of the disclosure as compared to each of the plurality of maintenance doses. In preferred embodiments of the methods of the first to seventh aspects, the administering step comprises intravenously administering a single 5 mg/kg to 30 mg/kg loading dose and a plurality of 1 mg/kg to 10 mg/kg maintenance doses, each dose comprising a compound of the disclosure or a pharmaceutically acceptable salt, hydrate, or solvate thereof, provided that the loading dose contains a greater amount of the compound of the disclosure as compared to each of the plurality of maintenance doses. In preferred embodiments of the methods of the first to seventh aspects, the administering step comprises intravenously administering a single 10 mg/kg to 20 mg/kg loading dose and a plurality of 2 mg/kg to 5 mg/kg maintenance doses, each dose comprising a compound of the disclosure or a pharmaceutically acceptable salt, hydrate, or solvate thereof, provided that the loading dose contains a greater amount of the compound of the disclosure as compared to each of the plurality of maintenance doses.

In one preferred embodiment of the methods of the first to seventh aspects, the administering step comprises intravenously administering a single 10 mg/kg loading dose and a plurality of 2 mg/kg maintenance doses, each dose comprising a compound of the disclosure or a pharmaceutically acceptable salt, hydrate, or solvate thereof. In another preferred embodiment of the methods of the first to seventh aspects, the administering step comprises intravenously administering a single 10 mg/kg loading dose and a plurality of 5 mg/kg maintenance doses, each dose comprising a compound of the disclosure or a pharmaceutically acceptable salt, hydrate, or solvate thereof. In preferred embodiments of the methods of the first to seventh aspects, the administering step comprises intravenously administering a single 20 mg/kg loading dose and a plurality of 5 mg/kg maintenance doses, each dose comprising a compound of the disclosure or a pharmaceutically acceptable salt, hydrate, or solvate thereof.

In each of the preferred embodiments above, each of the maintenance and loading doses are administered according to a course of treatment that is b.i.d. for a period of 3 to 12 days, such as 5 days or 7 days. In each of the preferred embodiments above, the compound of the disclosure is compound A, or a pharmaceutically acceptable salt, hydrate or solvate thereof. In each of the preferred embodiments above, each of the maintenance and loading doses are administered according to a course of treatment that is b.i.d. for a period of 3 to 12 days, such as 5 days or 7 days and the compound of the disclosure is compound A, or a pharmaceutically acceptable salt, hydrate or solvate thereof.

Dosage and Administration

In accordance with the methods of the present disclosure, the compounds of the disclosure are administered to the subject (or are contacted with cells of the subject) in an effective amount (such as an effective amount per day or an effective amount over a course of treatment). In some embodiments, the effective amount decreases the level of SARS-CoV-2 viral particles in the subject and/or limits or prevents an increase in the level of SARS-CoV-2 viral particles in the subject. In some embodiments, the effective amount decreases the viral titer of SARS-CoV-2 in a bodily fluid of the subject. In some embodiments, the effective amount inhibits the activity of SARS-CoV-2 RNA polymerase in the subject.

In the following discussion of dosage and administration, unless otherwise specified the effective amount per day is administered as: (i) a loading a dose and a maintenance dose on day 1 of the course of treatment and as a plurality of maintenance doses for the remining days of the course of treatment, wherein the loading dose contains a greater amount of a compound of the disclosure (such as Compound A) than the plurality of maintenance doses; or (ii) a loading a dose and a maintenance dose on day 1 of the course of treatment, a loading dose and a maintenance dose on at least one additional day during the course of treatment, and as a plurality of maintenance doses for the remining days of the course of treatment, wherein the loading dose contains a greater amount of a compound of the disclosure (such as Compound A) than the plurality of maintenance doses.

In certain embodiments, the effective amount of a compound of the disclosure ranges from about 0.1 mg/kg/day to about 80 mg/kg/day. In certain embodiments, the effective amount ranges from about 0.1 mg/kg/day to about 60 mg/kg/day. In certain embodiments, the effective amount ranges from about 0.1 mg/kg/day to about 50 mg/kg/day. In certain embodiments, the effective amount ranges from about 0.1 mg/kg/day to about 40 mg/kg/day. In certain embodiments, the effective amount ranges from about 0.1 mg/kg/day to about 30 mg/kg/day. In certain embodiments, the effective amount ranges from about 0.1 mg/kg/day to about 20 mg/kg/day. In certain embodiments, the effective amount ranges from about 0.1 mg/kg/day to about 15 mg/kg/day. In certain embodiments, the effective amount ranges from about 0.1 mg/kg/day to about 10 mg/kg/day. In certain embodiments, the effective amount ranges from about 0.1 mg/kg/day to about 5 mg/kg/day. The effective amounts per day described above are administered according to a course of treatment and may be administered in a single dose or in more than 1 dose per day. Preferably, the effective amounts per day described above are administered according to a course of treatment and administered in two doses each day (i.e., b.i.d.), wherein the amount of the compound of the disclosure in each dose need not be the same. Preferably, the course of treatment is from 2 days to 1 month, from 2 days to 3 weeks, from 2 days to 2 weeks, or from 2 days to 1 week; in a preferred embodiment the course of treatment is from 7 to 21 days or 7 days.

In some embodiments, the effective amount ranges from about 2 mg/kg/day to about 50 mg/kg/day. In some embodiments, the effective amount ranges from about 2 mg/kg/day to about 40 mg/kg/day the effective amount ranges from. In some embodiments, the effective amount ranges from about 2 mg/kg/day to about 30 mg/kg/day. In some embodiments, the effective amount ranges from about 2 mg/kg/day to about 25 mg/kg/day. In some embodiments, the effective amount ranges from about 2 mg/kg/day to about 20 mg/kg/day. In some embodiments, the effective amount ranges from about 2 mg/kg/day to about 15 mg/kg/day the effective amount ranges from. In some embodiments, the effective amount ranges from about 2 mg/kg/day to about 10 mg/kg/day. In some embodiments, the effective amount ranges from about 2 mg/kg/day to about 8 mg/kg/day. In some embodiments, the effective amount ranges from about 2 mg/kg/day to about 6 mg/kg/day. The effective amounts per day described above are administered according to a course of treatment and may be administered in a single dose or in more than 1 dose per day. Preferably, the effective amounts per day described above are administered according to a course of treatment and administered in two doses each day (i.e., b.i.d.), wherein the amount of the compound of the disclosure in each dose need not be the same. Preferably, the course of treatment is from 2 days to 1 month, from 2 days to 3 weeks, from 2 days to 2 weeks, or from 2 days to 1 week; in a preferred embodiment the course of treatment is from 7 to 21 days or 7 days.

In some embodiments, the effective amount of a compound of the disclosure ranges from about 6 mg/kg/day to about 60 mg/kg/day. In some embodiments, the effective amount ranges from about 6 mg/kg/day to about 50 mg/kg/day. In some embodiments, the effective amount ranges from about 6 mg/kg/day to about 40 mg/kg/day. In some embodiments, the effective amount ranges from about 6 mg/kg/day to about 30 mg/kg/day. In some embodiments, the effective amount ranges from about 6 mg/kg/day to about 25 mg/kg/day. In some embodiments, the effective amount ranges from about 6 mg/kg/day to about 20 mg/kg/day. In some embodiments, the effective amount ranges from about 6 mg/kg/day to about 15 mg/kg/day. In some embodiments, the effective amount ranges from about 6 mg/kg/day to about 12 mg/kg/day. In some embodiments, the effective amount ranges from about 6 mg/kg/day to about 10 mg/kg/day. In some embodiments, the effective amount ranges from about 8 mg/kg/day to about 40 mg/kg/day. In some embodiments, the effective amount ranges from about 8 mg/kg/day to about 30 mg/kg/day. In some embodiments, the effective amount ranges from about 8 mg/kg/day to about 25 mg/kg/day. In some embodiments, the effective amount ranges from about 8 mg/kg/day to about 20 mg/kg/day. The effective amounts per day described above are administered according to a course of treatment and may be administered in a single dose or in more than 1 dose per day. Preferably, the effective amounts per day described above are administered according to a course of treatment and administered in two doses each day (i.e., b.i.d.), wherein the amount of the compound of the disclosure in each dose need not be the same. Preferably, the course of treatment is from 2 days to 1 month, from 2 days to 3 weeks, from 2 days to 2 weeks, or from 2 days to 1 week; in a preferred embodiment the course of treatment is from 7 to 21 days or 7 days.

In some embodiment, the effective amount of a compound of the disclosure administered over a course of treatment ranges from about 20 mg to about 500 mg. In some embodiment, the effective amount of a compound of the disclosure administered over a course of treatment ranges from about 20 mg to about 250 mg. In some embodiment, the effective amount of a compound of the disclosure administered over a course of treatment ranges from about 20 mg to about 200 mg. In some embodiment, the effective amount of a compound of the disclosure administered over a course of treatment ranges from about 20 mg to about 150 mg. In some embodiment, the effective amount of a compound of the disclosure administered over a course of treatment ranges from about 20 mg to about 125 mg. In some embodiment, the effective amount of a compound of the disclosure administered over a course of treatment ranges from about 20 mg to about 100 mg. In some embodiment, the effective amount of a compound of the disclosure administered over a course of treatment ranges from about 20 mg to about 90 mg. In some embodiment, the effective amount of a compound of the disclosure administered over a course of treatment ranges from about 20 mg to about 80 mg. In some embodiment, the effective amount of a compound of the disclosure administered over a course of treatment ranges from about 20 mg to about 70 mg. In some embodiment, the effective amount of a compound of the disclosure administered over a course of treatment ranges from about 20 mg to about 60 mg. In some embodiment, the effective amount of a compound of the disclosure administered over a course of treatment ranges from about 20 mg to about 50 mg. In some embodiment, the effective amount of a compound of the disclosure administered over a course of treatment ranges from about 30 mg to about 50 mg. In some embodiment, the effective amount of a compound of the disclosure administered over a course of treatment ranges from about 60 mg to about 90 mg. In some embodiment, the effective amount of a compound of the disclosure administered over a course of treatment ranges from about 70 mg to about 100 mg. Preferably, the course of treatment is from 2 days to 1 month, from 2 days to 3 weeks, from 2 days to 2 weeks, or from 2 days to 1 week; in a preferred embodiment the course of treatment is from 7 to 21 days or 7 days.

In some embodiments, the effective amount ranges from about 7 mg/kg/day to about 30 mg/kg/day on day 1 of the course of treatment and from about 1 mg/kg/day to about 15 mg/kg/day on every other day of the course of treatment. In some embodiments, the effective amount ranges from about 10 mg/kg/day to about 14 mg/kg/day on day 1 of the course of treatment and from about 2 mg/kg/day to about 6 mg/kg/day on every other day of the course of treatment. In some embodiments, the effective amount ranges from about 13 mg/kg/day to about 17 mg/kg/day on day 1 of the course of treatment and from about 8 mg/kg/day to about 12 mg/kg/day on every other day of the course of treatment. In some embodiments, the effective amount ranges from about 23 mg/kg/day to about 27 mg/kg/day on day 1 of the course of treatment and from about 8 mg/kg/day to about 12 mg/kg/day on every other day of the course of treatment. The effective amounts per day described above are administered according to a course of treatment and may be administered in a single dose or in more than 1 dose per day. Preferably, the effective amounts per day described above are administered according to a course of treatment and administered in two doses each day (i.e., b.i.d.), wherein the amount of the compound of the disclosure in each dose need not be the same. Preferably, the course of treatment is from 2 days to 1 month, from 2 days to 3 weeks, from 2 days to 2 weeks, or from 2 days to 1 week; in a preferred embodiment the course of treatment is from 7 to 21 days or 7 days.

In some embodiments, the effective amount ranges from about 10 mg/kg/day to about 14 mg/kg/day on day 1 of the course of treatment, wherein the effective amount on day 1 is administered as a loading dose of about 8 mg/kg to about 12 mg/kg and as a maintenance dose of about 2 mg/kg to 6 mg/kg, and the effective amount on every other day of the course of treatment is from about 2 mg/kg/day to 6 mg/kg/day, wherein the effective amount on every other day of the course of treatment is administered as a maintenance dose of 1 mg/kg to 4 mg/kg two times per day. In some embodiments, the effective amount is administered two times per day (b.i.d) as a loading dose of about 8 mg/kg to about 12 mg/kg as the first dose of the course of treatment, a maintenance dose of 1 mg/kg to 3 mg/kg as the second dose of the course of treatment, and as a plurality of maintenance doses of about 1 mg/kg to about 3 mg/kg for the remainder of the course of treatment. In some embodiments, the effective amount is about 12 mg/kg/day on day 1 of the course of treatment, wherein the effective amount on day 1 is administered as a loading dose of about 10 mg/kg and as a maintenance dose of about 2 mg/kg, and the effective amount on every other day of the course of treatment is about 4 mg/kg/day, wherein the effective amount on every other day of the course of treatment is administered as a maintenance dose of about 2 mg/kg two times per day. Preferably, the course of treatment is from 2 days to 1 month, from 2 days to 3 weeks, from 2 days to 2 weeks, or from 2 days to 1 week; in a preferred embodiment the course of treatment is from 7 to 21 days or 7 days.

In some embodiments, the effective amount ranges from about 13 mg/kg/day to about 17 mg/kg/day on day 1 of the course of treatment wherein the effective amount on day 1 is administered as a loading dose of about 8 mg/kg to about 12 mg/kg and as a maintenance dose of about 3 to 7 mg/kg, and the effective amount on every other day of the course of treatment is from about 6 mg/kg/day to 14 mg/kg/day, wherein the effective amount on every other day of the course of treatment is administered as a maintenance dose of 3 mg/kg to 7 mg/kg two times per day. In some embodiments, the effective amount is administered two times per day (b.i.d) as a loading dose of about 8 mg/kg to about 12 mg/kg as the first dose of the course of treatment, a maintenance dose of 3 mg/kg to 7 mg/kg as the second dose of the course of treatment, and as a plurality of maintenance doses of about 3 mg/kg to about 7 mg/kg for the remainder of the course of treatment. In some embodiments, the effective amount is about 15 mg/kg/day on day 1 of the course of treatment, wherein the effective amount on day 1 is administered as a loading dose of about 10 mg/kg and as a maintenance dose of about 5 mg/kg, and the effective amount on every other day of the course of treatment is about 10 mg/kg/day, wherein the effective amount on every other day of the course of treatment is administered as a maintenance dose of about 5 mg/kg two times per day. Preferably, the course of treatment is from 2 days to 1 month, from 2 days to 3 weeks, from 2 days to 2 weeks, or from 2 days to 1 week; in a preferred embodiment the course of treatment is from 7 to 21 days or 7 days.

In some embodiments, the effective amount ranges from about 23 mg/kg/day to about 27 mg/kg/day on day 1 of the course of treatment, wherein the effective amount on day 1 is administered as a loading dose of about 18 mg/kg to about 22 mg/kg and as a maintenance dose of about 3 to 7 mg/kg, and the effective amount on every other day of the course of treatment is from about 6 mg/kg/day to 14 mg/kg/day, wherein the effective amount on every other day of the course of treatment is administered as a maintenance dose of 3 mg/kg to 7 mg/kg two times per day. In some embodiments, the effective amount is administered two times per day (b.i.d) as a loading dose of about 18 mg/kg to about 22 mg/kg as the first dose of the course of treatment, a maintenance dose of 3 mg/kg to 7 mg/kg as the second dose of the course of treatment, and as a plurality of maintenance doses of about 3 mg/kg to about 7 mg/kg for the remainder of the course of treatment. In some embodiments, the effective amount is about 25 mg/kg/day on day 1 of the course of treatment, wherein the effective amount on day 1 is administered as a loading dose of about 20 mg/kg and as a maintenance dose of about 5 mg/kg, and the effective amount on every other day of the course of treatment is about 10 mg/kg/day, wherein the effective amount on every other day of the course of treatment is administered as a maintenance dose of about 5 mg/kg two times per day. Preferably, the course of treatment is from 2 days to 1 month, from 2 days to 3 weeks, from 2 days to 2 weeks, or from 2 days to 1 week; in a preferred embodiment the course of treatment is from 7 to 21 days or 7 days.

In certain embodiments, each dose is administered according to a course of treatment. As used herein, the term "dose" refers to an amount of a compound of the disclosure administered at a given time point according to a course of treatment. For example, if a course of treatment for a compound of the disclosure is b.i.d (2 times/administrations per day) for 7 days, the two administrations on each of days 1-7 would comprise administering a dose of a compound of the disclosure (for 2 doses each day). In certain embodiments, more than 1 dose is administered per day according to a course of treatment, such as two doses per day (i.e., b.i.d) or three doses per day (i.e., t.i.d).

When 2 or more doses are administered on a given day according to a course of treatment, each dose administered according to the course of treatment may contain the same amount of a compound of the disclosure or one or more of doses administered according to the course of treatment may contain a greater or lesser amount of a compound of the disclosure as compared to another dose administered according to the course of treatment. For example, if a course of treatment is b.i.d for 7 days, the first dose administered on day 1 may contain a first amount (i.e., 10 mg/kg) and the second dose administered on day may contain a second amount (i.e., 5 mg/kg), and the two doses administered on each of days 2-7 may contain the second amount. As another example, if a course of treatment for a compound of the disclosure is b.i.d for 7 days, the first dose administered on day 1 may contain a first amount (i.e., 10 mg/kg), the second dose administered on day 1 may contain a second amount (i.e., 5 mg/kg), the two doses administered on each of days 2-4 may contain the second amount, and the two doses administered on each of days 5-7 may contain a third amount (i.e., 2 mg/kg).

A dose may be further divided into a sub-dose. Any given dose may be delivered in a single unit dose form or more than one unit dose form. For example, a dose when given by IV administration may be provided as a single IV infusion (i.e., a single 10 mg/kg IV infusion) or as two or more IV infusions administered one after the other (i.e., two 5 mg/kg IV infusions). Further, a sub-dose might be, for example, a number of discrete loosely spaced administrations, such as multiple inhalations from an insufflator, by application of a plurality of drops into the eye, or multiple tablets for oral administration.

In certain embodiments, only one dose of a compound of the disclosure is administered during a course of treatment and no further doses are administered. Therefore, in the methods described herein the methods may comprise the administration of a single dose of an effective amount of a compound of the disclosure during the entire course of treatment. When a single dose is administered during the entire course of treatment, the course of treatment is less than 4 weeks, such as 1 week, 2 weeks or three weeks. In certain embodiments, the single dose contains an effective amount of a compound of the disclosure.

In certain embodiments, more than one dose of a compound of the disclosure is administered during a course of treatment. Therefore, in the methods described herein, the methods may comprise the administration of multiple doses during the course of treatment. In certain embodiments, the course of treatment may range from 2 days to 1 month, from 2 days to 3 weeks, from 2 days to 2 weeks, or from 2 days to 1 week. In certain embodiments, the course of treatment may range from 2 days to 6 days, from 2 days to 5 days, from 2 days to 4 days, or from 2 days to 3 days. In certain embodiments, the course of treatment may range from 7 days to 21 days, from 7 days to 14 days, from 7 days to 10 days, or from 4 days to 10 days. In certain embodiments, a dose is delivered at least 1 time per day (i.e., 1 to 3 times) during the course of treatment. In certain embodiments, a dose is not administered every day during the course of treatment (for example, a dose is be administered at least 1 timer per day every other day, every third day, or every week during the course of treatment). Furthermore, the amount of a compound of the disclosure in each dose need not be the same as discussed above.

In a preferred embodiment, a course of treatment may comprise administering at least one dose as a loading dose and at least one dose as a maintenance dose, wherein the loading dose contains a greater amount of a compound of the disclosure as compared to the maintenance dose (such as, but not limited to, 2 to 15 times higher). In one aspect of this embodiment, the loading dose is administered initially, either for a single administration or more than one administration, followed by administration of one or more maintenance doses through the remaining course of treatment. For example, for a course of treatment that is b.i.d. for 7 days, a loading dose of 10 mg/kg may be administered as the first dose on day 1 of the course of treatment, followed by maintenance doses of 2 mg/kg for the remainder of the course of treatment. As another example, for a course of treatment that is b.i.d. for 7 days, a loading dose of 10 mg/kg may be administered as the first dose on day 1 of the course of treatment, followed by maintenance doses of 5 mg/kg for the remainder of the course of treatment. As still another example, for a course of treatment that is b.i.d. for 7 days, a loading dose of 20 mg/kg may be administered as the first dose on day 1 of the course of treatment, followed by maintenance doses of 5 mg/kg for the remainder of the course of treatment. As a further example, for a course of treatment that is b.i.d. for 7 days, a loading dose of 20 mg/kg may be administered as the first dose on day 1 of the course of treatment, followed by maintenance doses of 5 mg/kg as the second dose on day 1 and each dose on days 2-4, followed by maintenance doses of 2 mg/kg for the remainder of the course of treatment.

Furthermore, a loading dose may be given as a dose that is not the first dose administered during a course of treatment. For example, a loading dose may be administered as the first dose on day 1 and as a dose one additional day (for example, day 4). For example, for a course of treatment that is b.i.d. for 7 days, a loading dose of 10 mg/kg may be administered as the first dose on day 1 of the course of treatment, followed by maintenance doses of 2 mg/kg as the second dose on day 1 and each dose on days 2-3, followed by a loading dose of 10 mg/kg as the first dose on day 4 and by maintenance doses of 2 mg/kg for the remainder of the course of treatment. When more than one loading dose is administered during a course of treatment, the loading dose may be the same (i.e., 10 mg/kg) or different (i.e., 20 mg/kg for the first loading dose and 10 mg/kg for each other loading dose).

In certain embodiments, the loading dose comprises 2 to 15 times more of a compound of the disclosure as compared to a maintenance dose administered during the same course of treatment. In certain embodiments, the loading dose comprises 2 to 10 times more of a compound of the disclosure as compared to a maintenance dose administered during the same course of treatment. In certain embodiments, the loading dose comprises 2 to 5 times more of a compound of the disclosure as compared to a maintenance dose administered during the same course of treatment.

In certain embodiments of the loading and maintenance doses discussed above, administration of one or more loading and/or maintenance doses may comprise administering one or more sub-doses and/or administering one or more unit dose forms.

In certain embodiments, the course of treatment is initiated (i.e., the first dose administered) after a subject has been infected with SARS-CoV-2. In certain embodiments, the course of treatment is initiated any time after a subject has been infected with SARS-CoV-2. In certain embodiments, the course of treatment is initiated any time after a subject has been infected with SARS-CoV-2 and before an active SARS-CoV-2 infection can be detected (i.e., by laboratory diagnosis or other methods). In certain embodiments, the course of treatment is initiated any time during which a subject has an active SARS-CoV-2 infection (i.e., by laboratory diagnosis or other methods). An active SARS-CoV-2 infection may be detected in any bodily fluid or tissue of the subject. In certain embodiments, the bodily fluid is blood. In certain embodiments, the bodily fluid is other than blood.

In certain embodiments, the course of treatment is initiated 1-10 days after a subject has been infected with SARS-CoV-2. In certain embodiments, the course of treatment is initiated 10-20 days after a subject has been infected with SARS-CoV-2. In certain embodiments, the course of treatment is initiated 1-10 days after a subject exhibits a symptom of a SARS-CoV-2 infection. In certain embodiments, the course of treatment is initiated 1-6 days after a subject exhibits a symptom of a SARS-CoV-2 infection. In certain embodiments, the course of treatment is initiated 1-3 days after a subject exhibits a symptom of a SARS-CoV-2 infection.

In certain embodiments, the course of treatment is initiated before a subject is infected with SARS-CoV-2 (i.e., a prophylactic administration). For example, if a subject is planning to travel to a region where SARS-CoV-2 infection has been reported or believes he/she may be exposed to SARS-CoV-2, the subject may undergo a course of treatment with a compound of the disclosure prior to travel to the region. Furthermore, a subject may be someone that is not initially exposed to SARS-CoV-2 infection from a non-human vector source. For example, the spouse or partner of someone who has been exposed to SARS-CoV-2 or who is at risk for exposure to SARS-CoV-2 (for example, by traveling to an area where SARS-CoV-2 infection has been reported) may undergo a course of treatment with a compound of the disclosure as well. Such a prophylactic use of the compounds of the disclosure are beneficial not only to protect the subject that is administered a compound of the disclosure, but also in protecting those the subject comes into contact with (for example, family members and co-workers).

In any of the foregoing embodiments, the dose may comprise a compound of the disclosure alone or a compound of the disclosure in a pharmaceutical composition. In any of the foregoing embodiments, each dose is delivered by IM administration. In any of the foregoing embodiments, each dose is delivered by IV administration. In any of the foregoing embodiments, each dose is delivered by parenteral administration. In any of the foregoing embodiments, each dose is delivered by oral administration. IV administration is a preferred form of administration for the compounds of the disclosure.

In any of the foregoing embodiments, each dose contains an amount of Compound A. In any of the foregoing embodiments, each dose contains an amount of Compound A as a pharmaceutically acceptable salt. In any of the foregoing embodiments, each dose contains an amount of Compound A as a pharmaceutically acceptable salt, hydrate, solvate or combination of the foregoing.

Pharmaceutical Compositions

The compounds of the disclosure may be formulated into pharmaceutical compositions for administration to subjects in a biologically compatible form suitable for administration in vivo. The present disclosure provides a pharmaceutical composition comprising compounds of the disclosure in combination with a pharmaceutically acceptable carrier. Preferably, the pharmaceutically acceptable carrier is chemically inert toward the active compounds and is non-toxic under the conditions of use. The pharmaceutically-acceptable carrier employed herein may be selected from various organic or inorganic materials that are used as materials for pharmaceutical formulations and which are incorporated as analgesic agents, buffers, binders, disintegrants, diluents, emulsifiers, excipients, extenders, glidants, solubilizers, stabilizers, suspending agents, tonicity agents, vehicles and viscosity-increasing agents. Pharmaceutical additives, such as antioxidants, aromatics, colorants, flavor-improving agents, preservatives, and sweeteners, may also be added. Examples of acceptable pharmaceutical carriers include, but are not limited to, carboxymethyl cellulose, crystalline cellulose, glycerin, gum arabic, glucose, lactose, gelatin, magnesium stearate, methyl cellulose, powders, sodium alginate, sucrose, starch, talc, water or saline solution, polymers (such as polyethylene glycol, polypropylene glycol, and polysorbate 20), silica gel, sodium stearate, glycerol monostearate, talc, sodium chloride, dried skim milk, glycerol, oils, fatty acids, or alcohols (such as ethanol). In some embodiments, the carrier is saline or water. In some embodiments, the carrier comprises saline. In some embodiments, the carrier comprises water.

Surfactants such as, but not limited to, detergents, are also suitable for use in the formulations. Specific examples of surfactants include polyvinylpyrrolidone, polyvinyl alcohols, copolymers of vinyl acetate and of vinylpyrrolidone, polyethylene glycols, benzyl alcohol, mannitol, glycerol, sorbitol or polyoxyethylenated esters of sorbitan; lecithin or sodium carboxymethylcellulose; or acrylic derivatives, such as methacrylates and others, anionic surfactants, such as alkaline stearates, in particular sodium, potassium or ammonium stearate; calcium stearate or triethanolamine stearate; alkyl sulfates, in particular sodium lauryl sulfate and sodium cetyl sulfate; sodium dodecylbenzene sulphonate or sodium dioctyl sulphosuccinate; or fatty acids, in particular those derived from coconut oil, cationic surfactants, such as water-soluble quaternary ammonium salts of formula $N^+R'R''R'''R''''Y^-$, in which the R radicals are identical or different optionally hydroxylated hydrocarbon radicals and $Y^-$ is an anion of a strong acid, such as halide, sulfate and sulfonate anions; cetyltrimethylammonium bromide is one of the cationic surfactants which can be used, amine salts of formula $N^+R'R''R'''$, in which the R radicals are identical or different optionally hydroxylated hydrocarbon radicals; octadecylamine hydrochloride is one of the cationic surfactants which can be used, non-ionic surfactants, such as optionally polyoxyethylenated esters of sorbitan, in particular Polysorbate 80, or polyoxyethylenated alkyl ethers; polyethylene glycol stearate, polyoxyethylenated derivatives of castor oil, polyglycerol esters, polyoxyethylenated fatty alcohols, polyoxyethylenated fatty acids or copolymers of ethylene oxide and of propylene oxide, amphoteric surfactants, such as substituted lauryl compounds of betaine, When administered to a subject, the compounds of the disclosure and pharmaceutically acceptable carriers may be sterile. The pharmaceutical compositions, if desired, may also contain minor amounts of wetting or emulsifying agents, or pH buffering agents.

The pharmaceutical formulations of the present disclosure are prepared by methods well-known in the pharmaceutical arts. For example, the compounds of the disclosure are brought into association with a carrier, as a suspension or solution. Optionally, one or more accessory ingredients (e.g., buffers, flavoring agents, surface active agents, and the like) also are added. The choice of carrier is determined by the solubility and chemical nature of the compounds, chosen route of administration and standard pharmaceutical practice. In some embodiments, the formulation comprises a compound of the disclosure and water. In some embodiments, the formulation comprises a compound of the disclosure and saline.

In some embodiments, water is a carrier when the compound of the disclosure is administered intravenously. In some embodiments, the carrier is a saline solution when the compound of the disclosure is administered intravenously. In some embodiments, the carrier is a lactated Ringer's solution when the compound of the disclosure is administered intravenously. Aqueous dextrose and glycerol solutions may also be employed as carriers when the compound of the disclosure is administered intravenously.

For oral administration, a formulation of the compound of the disclosure may be presented as capsules, tablets, powders, granules, or as a suspension or solution. Capsule formulations may be gelatin; soft-gel or solid. Tablets and capsule formulations may further contain one or more adjuvants, binders, diluents, disintegrants, excipients, fillers, or lubricants, each of which are known in the art. Examples of such include carbohydrates such as lactose or sucrose, dibasic calcium phosphate anhydrous, corn starch, mannitol, xylitol, cellulose or derivatives thereof, microcrystalline cellulose, gelatin, stearates, silicon dioxide, talc, sodium starch glycolate, acacia, flavoring agents, preservatives, buffering agents, disintegrants, and colorants. Orally administered compositions may contain one or more optional agents such as, but not limited to, sweetening agents such as fructose, aspartame or saccharin; flavoring agents such as peppermint, oil of wintergreen, or cherry; coloring agents; and preservative agents, to provide a pharmaceutically palatable preparation.

For parenteral administration the compounds of the disclosure may be combined with a sterile aqueous solution that is isotonic with the blood of the subject. Such a formulation is prepared by dissolving a solid active ingredient in water containing physiologically-compatible substances, such as sodium chloride, glycine and the like, and having a buffered pH compatible with physiological conditions, so as to produce an aqueous solution, then rendering said solution sterile. The formulation may be presented in unit dose form, such as sealed ampules or vials. The formulation may be delivered by any mode of injection, including, without limitation, epifascial, intracapsular, intracranial, intracutaneous, intrathecal, intramuscular, intraorbital, intraperitoneal, intraspinal, intrasternal, intravascular, intravenous, parenchymatous, subcutaneous, or sublingual or by way of catheter into the subject's body. A preferred mode of injection is intravenous.

Parenteral administration includes aqueous and non-aqueous based solutions. Examples of which include, for example, water, saline, aqueous sugar or sugar alcohol solutions, alcoholic (such as ethyl alcohol, isopropanol, glycols), ethers, oils, glycerides, fatty acids, and fatty acid esters. In some embodiments, water is used for parenteral administration. In some embodiments, saline is used for parenteral administration. Oils for parenteral injection include animal, vegetable, synthetic or petroleum-based oils. Examples of sugars for solution include sucrose, lactose, dextrose, mannose, and the like. Examples of oils include mineral oil, petrolatum, soybean, corn, cottonseed, peanut, and the like. Examples of fatty acids and esters include oleic acid, myristic acid, stearic acid, isostearic acid, and esters thereof.

In some embodiments, the compounds of the disclosure are in unit dose form such as a tablet, capsule, infusion bag for intravenous administration, or single-dose vial. Suitable unit dose forms may contain and effective amount (including specific examples of an effective amount described herein), The effective amount may be determined and/or modified during clinical trials designed appropriately for each of the conditions for which administration of a compound of the disclosure is indicated and will, of course, vary depending on the desired clinical endpoint.

The present disclosure also provides articles of manufacture and/or medicaments for treating diseases and disorder in a subject as described herein. The articles of manufacture and/or medicaments comprise a compound of the disclosure and a carrier, and optionally further containing at least one additional antiviral compound, as described herein. The articles of manufacture and/or medicaments may be packaged with indications for various disorders that are capable of being treated.

Additional Therapeutic Agents

In addition, the compositions or methods described herein may further comprise one or more additional anti-viral agents in combination with a compound of the disclosure. Examples of such anti-viral agents include, but are not limited to, remdisivir, hydrochloroquine, chloroquine, irbesartan, toremifene, camphor, equiline, mesalazine, mercaptopurine, paraoxetine, sirolimus, carvedilol, dactinomycin, melatonin, quinacrine, eplerenone, enoclin, oxymethalone, ENU2000, azithromycin, lopinovir/ritonavir, umifenovir, cytovene, ganciclovir, trisodium phosphonoformate, ribavirin, interferon, d4T, ddI, AZT, amantadine, rimantadine, acyclovir, foscarnet, laninamivir, oseltamivir, zanamivir, favipiravir, baloxavir marboxil, and peramivir.

Compounds that relate to inhibition of influenza polymerase are described, for example, in U.S. Pat. Nos. 7,388, 002; 7,560,434; and in U.S. patent application Ser. No. 12/440,697 (published as U.S. Patent Publication No. 20100129317); and Ser. No. 12/398,866 (published as U.S. Patent Publication No. 20090227524).

In some embodiments, the compositions of the invention further comprise two additional anti-viral agents and the methods of the invention further comprise administration of two additional anti-viral agents. Thus, in some embodiments, the composition of the invention further comprise one or more additional anti-viral agents and the methods of the invention further comprise administration of one or more additional anti-viral agents.

Kits

The present disclosure also provides a kit for use in the methods described herein, the kit comprising a compound of the disclosure, or a pharmaceutically acceptable salt, hydrate, or solvate thereof, and at least one of the following: (i) at least one other therapeutic agent; (ii) packaging material; (iii) instructions for administering the compound of the disclosure, or pharmaceutically acceptable salt, hydrate, or solvate thereof and the other therapeutic agent or agents to a subject to treat a SARS-CoV-2 infection in the subject.

In one embodiment of the kits disclosed, the subject is a human. In another embodiment of the kits disclosed, the compound of the disclosure is Compound A, or a pharmaceutically acceptable salt, hydrate, or solvate thereof.

All patent applications, patents, and printed publications cited herein are incorporated herein by reference in the entireties, except for any definitions, subject matter disclaimers or disavowals, and except to the extent that the incorporated material is inconsistent with the express disclosure herein, in which case the language in this disclosure controls.

The disclosure is further described by the following non-limiting Examples.

EXAMPLES

Example 1—In Vitro Testing of Compound A

Compound A exhibited antiviral effects in vitro against SARS-CoV (Urbani strain) and MERS-CoV (Jordan strain) by neutral red uptake (NRU) in Vero-76 cells (as shown in Table 1A).

TABLE 1A

| Virus | $EC_{50}$ (μM) | CLE | Adjusted $EC_{50}$ (μM) |
| --- | --- | --- | --- |
| SARS-CoV | 57.7 | 8% | 4.6 |
| MERS-CoV | 26.9 | 8% | 2.15 |

Vero-76 cells (African green monkey kidney cells) were obtained from the American Type Culture Collection (ATCC, Manassas, Va.) and were routinely passed in minimal essential medium (MEM with 0.15% $NaHCO_3$; Hyclone Laboratories, Logan, Utah, USA) supplemented with 5% fetal bovine serum (FBS, Hyclone). When evaluating Compound A, the serum was reduced to a final concentration of 2.5%, and gentamicin was added to the test medium to a final concentration of 50 μg/mL. Cells were seeded to 96-well flat-bottomed tissue culture plates, 0.2 mL/well, at the proper cell concentration, and incubated overnight at 37° C. in order to establish a cell monolayer. When the monolayer was established, the growth medium was decanted and the various dilutions of test compound were added to each well (3 wells/dilution, 0.1 mL/well). Compound diluent medium was added to cell and virus control wells (0.1 mL/well). Virus, diluted in test medium, was added to compound test wells (3 wells/dilution of compound) and to virus control wells (6 wells) at 0.1 mL/well. Virus (viral MOI=0.001) was added approximately 5 min after compound. Test medium without virus was added to all toxicity control wells (2 wells/dilution of each test compound) and to cell control wells (6 wells) at 0.1 mL/well. The plates were incubated at 37° C. in a humidified incubator with 5% CO2, 95% air atmosphere for 3 days NR uptake was chosen as the dye quantitation method for evaluating antiviral drugs based on the findings of Smee et al (*Virol. Methods* 2002, 106:71-79). The NR assay was performed using a modified method of Cavenaugh et al. (*Invest. New Drugs* 1990, 8:347-354) as described by Barnard et al. (*Antiviral Chem. Chemother.* 2001, 12:220-231). Briefly, medium was removed from each well of a plate, 0.034% NR was added to each well of the plate and the plate incubated for 2 hr at 37° C. in the dark. The NR solution was then removed from the wells. After rinsing and aspirating to dryness, the remaining dye was extracted for 30 min at room temperature in the dark from the cells using absolute ethanol buffered with Sorenson citrate buffer. Absorbances at 540 nm/405 nm are read with a microplate reader (Opsys MR™, Dynex Technologies, Chantilly, Va., USA). Absorbance values were expressed as percent of untreated controls. The 50% effective dose ($EC_{50}$) was calculated based on the absorbance data.

Using the NR uptake assay Compound A showed antiviral activity versus SARS-CoV and MERS-CoV with $EC_{50}$ values of 57.7 µM (adjusted $EC_{50}$ value of 4.6 µM) and 26.9 µM (adjusted $EC_{50}$ value of 2.15 µM) in Vero76 cells, respectively. The adjusted $EC_{50}$ value was calculated using a conversion factor (CLE; cell line efficiency) to account for the less efficient conversion of Compound A to the active triphosphate form.

Compound A exhibited antiviral effects in vitro against SARS-CoV-2 (WA1/2020 strain) as determined by virus yield reduction assay (VYR) and cytopathic effect (CPE) in Vero-76 cells (as shown in Table 1B).

TABLE 1B

| Virus | $EC_{90}$ (µM) | CLE | Adjusted $EC_{90}$ (µM) | $CC_{50}$ (µM) | SI |
|---|---|---|---|---|---|
| SARS-CoV-2 | 10.9 | 8% | 0.87 | >296 | >27 |

The in vitro antiviral activity of BCX4430 on SARS-CoV-2 (USA_WA1/2020) replication was evaluated in Vero76 cells (grown as described above). Antiviral activity was assessed with 8 serial dilutions of Compound A ranging from 0.032-100 ug/mL and quantified using virus yield reduction (VYR) assay (*Antiviral Res.*, 2016, 13:61-65). A protease inhibitor M128533 with antiviral activity versus SARS-CoV and SARS-CoV-2 was used as a positive control in the assay. Compound A was added 24 hours prior to infection. Vero76 cells were infected with a MOI of 0.002 and the antiviral activity quantified with the VYR assay at day 3. Cytotoxicity was assessed with the Neutral Red cytopathic assay and reported as the concentration associated with 50% cytotoxicity ($CC_{50}$) (*Virol. Methods*, 2017 246:51-57). SI was calculated by the formula $SI=CC_{50}/EC_{90}$.

Using the VYR assay Compound A showed antiviral activity versus SARS-CoV-2 with an $EC_{90}$ value of 10.9 µM (adjusted $EC_{90}$ value of 0.87 µM) in Vero76 cells. The cytotoxic activity of Compound A was >295.7 µM in Vero76 cells providing a SI>27.

These results show that Compound A is effective in inhibiting SARS-CoV-2 virus and related viruses in vitro.

Example 2—Pharmacokinetic Modeling for Intramuscular and Intravenous Administration Compartmental models for IM injection and IV infusion were developed for Compounds A using the PK model function of Phoenix WinNonlin version 8 (Certara, US). A two-compartment model was the best model for each dosing regimen (model 11 for IM and model 9 for IV) and was selected for simulation of the dosing regimens. The IV infusion model was optimized based on the final model parameters for the IM injection. The fit of each model was assessed by the model diagnostics, as well as visual inspection of the fit of the predictive curve. Different weighting options were utilized to improve the fit of the model. Single and multiple dose simulations were performed for various dosing regimens. Simulations included Compound A administration in subjects with impaired renal clearance. For multiple dose regimens, $AUC_{tau}$ values were determined using Non-Compartmental Analysis (NCA) of the simulated concentration-time data. Although Compound A is administered as weight-based dosing, for simulations, the dose was normalized in all simulations for a 60-kg human.

Average Compound A concentrations following administration of Compound A at doses of 1.8, 4, 7 and 10 mg/kg by IM injection (as described in Example 3) were utilized for modeling. Modeling of the exposure following administration of these doses did not result in model PK parameters that were measurably different. Therefore, the 10 mg/kg dose was chosen for development of the final model as this exposure is anticipated to be in the range that would be efficacious in animal models. The model parameters for the 2-compartment IM model are reported in Table 2.

TABLE 2

| Parameters | Estimate |
|---|---|
| Vc (mL) | 74605.96 |
| K (1/h) | 9.843663 |
| CL/F (mL/h) | 17514.91 |
| V2 (mL) | 791118.2 |
| CL2/F (mL/h) | 15961.4 |

Overall for the single dose IM exposures, predictions of $C_{max}$ and $AUC_{0-24}$ were within 20% for all doses between 1.8 mg/kg and 10 mg/kg. Residual plots did not indicate any bias in the model. Table 3 shows a comparison of simulated and actual mean PK parameters following administration of a 10 mg/kg IM dose of Compound A. When comparing simulated IM exposure of Compound A following multiple daily administrations, $AUC_{tau}$ was well predicted in comparison to data from human subjects as described in Example 3, with simulated $AUC_{tau}$ values within 12-14% of actual exposure, verifying predictability of exposure after multiple dose administration.

TABLE 3

| | Geometric Mean (% CV) Parameter | Simulated PK Parameter |
|---|---|---|
| $C_{max}$ (ng/mL) | 7980 (30.6) | 6886 |
| $T_{max}$ (h) | 0.375 (0.25, 0.5) | 0.33 |
| $AUC_{0-24}$ (ng*h/mL) | 20300 (19.8) | 20700 |

Using the final compartmental parameters for the IM model, an IV infusion model was developed for a 60-minute IV infusion. As a reference, the IM data set from human subject (Example 3) was used to evaluate the fit of the simulated data. Model parameters for the IV infusion route of administration are shown in Table 4. The volume and clearance estimates for the IV Infusion model differ slightly from the IM model as a result of the optimization of the model. This resulted in slightly higher predicted $C_{max}$ values after IV infusion compared to the predicted after IM injection.

TABLE 4

| Parameters | Estimate |
|---|---|
| Vc (mL) | 69442.81 |
| CL/F (mL/h) | 16048.99 |

TABLE 4-continued

| Parameters | Estimate |
|---|---|
| V2 (mL) | 706075.5 |
| CL2/F (mL/h) | 12713.63 |

Simulations for the IV doses that were utilized in the Phase I clinical trial described in Example 4 are shown in Table 5. Exposure at the highest dose is predicted to be lower than the NOAEL exposure of Compound A in NHP, approximately 52,500 ng*h/mL at a 30 mg/kg dose. The Compound A exposure simulated for IV infusion is similar to actual exposure observed after IM injection in the Phase I clinical trial described in Example 3.

TABLE 5

|  | 5 mg/kg | 10 mg/kg | 15 mg/kg | 20 mg/kg |
|---|---|---|---|---|
| $C_{max}$ (ng/mL) | 3500 | 7000 | 10600 | 14000 |
| $AUC_{0-24}$ (ng*h/mL) | 11800 | 23600 | 35400 | 47300 |

Simulations for multiple dose administration were also conducted for both once daily (QD) and twice daily dosing (BID). In Table 6, exposure of various regimens of Compound A at steady state is summarized. Examples of loading dosing/maintenance dose regimens are also presented.

TABLE 6

|  | $C_{max, ss}$ (ng/mL) | $AUC_{tau, ss}$ (ng*h/mL) | $AUC_{24, ss}$ (ng*h/mL) |
|---|---|---|---|
| 5 mg/kg QD | 3700 | 15400 | N/A |
| 10 mg/kg QD | 7400 | 31000 | N/A |
| 10 mg/kg, then 3 mg/kg QD | 2300 | 9900 | N/A |
| 5 mg/kg BID | 4000 | 15500 | 30700 |
| 10 mg/kg BID | 8000 | 30900 | 61400 |
| 10 mg/kg, then 3 mg/kg BID | 2400 | 9600 | 19000 |

For simulation of dosing regimens in subjects with renal impairment, the existing 2-compartment PK model was used to evaluate dosing regimens in the setting of renal impairment with estimated effective creatinine clearance (CrCl) of 30 mL/min, the rate being utilized for CVVH. The relevant model term for clearance was modified by reduction by two-thirds, i.e. to one-third of normal. This model with reduced renal clearance was then utilized to simulate different dosing regimens, with twice daily schedule of administration every 12 hours (Q12h). In these regimens, the initial loading dose of 10 mg/kg was followed by Q12h dosing of either 2.5 mg/kg or 2.0 mg/kg maintenance dose. Table 7 shows the estimated PK parameters for the simulated dosing regimens.

Reducing the renal clearance term in the model (C11) in the 2-compartment PK model by ⅔ (that is to one third of normal) affected the terminal elimination of Compound A. The AUC0-24 for a single 10 mg/kg dose in the reduced clearance simulation was 35,000 ng*h/mL, in comparison to approximately 21,000 ng*h/mL in simulated subjects with normal renal clearance.

TABLE 7

|  | 10 mg/kg loading dose then 2.5 mg/kg maintenance dose Q12 h | 10 mg/kg loading dose then 2.0 mg/kg maintenance dose Q12 h |
|---|---|---|
| $AUC_{0-12}$ (ng*h/mL) | 28,700 | 28,700 |
| $AUC_{0-24}$ (ng*h/mL) | 40,900 | 39,500 |
| $AUC_{144-168}$ (ng*h/mL) | 37,500 | 32,300 |
| $C_{max}$ Day 1 (ng/mL) | 7,000 | 7,000 |
| $C_{max}$ Day 7, 2nd dose (ng/mL) | 2,850 | 2,300 |
| $C_{trough}$ Day 7 (ng/mL) | 1,090 | 900 |

The simulated regimen with 10 mg/kg loading dose, 2 mg/kg maintenance dose Q12h for a total of 7 days of dosing gave exposure estimates that were close to those in healthy human subjects dosed at 10 mg/kg QD×7d: $AUC_{0-24}$ of 39,500 ng*hr/mL compared to 34,500 ng*hr/mL and was deemed to be an appropriate dose to select.

This Example verifies the ability of the described models to predict plasma exposure of Compound A. The IM model was highly predictive of the drug exposure after both single and multiple dose administration, although it slightly underpredicted the mean Cmax of Compound A. The ability of the model to predict exposure was verified using actual exposure in healthy subjects who were administered Compound A. The IV infusion model was developed from the IM model to simulate IV infusion exposure following single and multiple dose administration. The ability of the model to predict exposure was verified using actual exposure in subjects who were administered Compound A after developing yellow fever vaccine-associated viscerotropic disease (YEL-AVD) (results shown in Example 5).

Example 3—Intramuscular Injection of Compound a in Human Subjects

The agent used in this Example was compound A (the compound of formula I, where A is $NH_2$ and B is H as the HCL salt). A phase 1 double-blind, placebo-controlled, dose-ranging study was conducted to evaluate the safety, tolerability, and pharmacokinetics of Compound A administered by intramuscular injection (IM) in healthy human subjects. The study was conducted in three parts. In part 1, subjects received a single dose of Compound A at doses from 0.3 mg/kg to 10 mg/kg via IM administration. In Part 2, the effect of lidocaine administration (co-administered with Compound A at a dose of 4 mg/kg) on alleviation of pain associated with injection was also evaluated. In part 3, subjects received Compound A for 7 days (q.d.) at doses of 2.5 mg/kg/day, 5 mg/kg/day or 10 mg/kg/day via IM administration. 50 subjects received single doses of Compound A in part 1 (12 subjects received placebo) and 23 subjects received multiple doses of Compound A in part 2 (6 subjects received placebo). The assignments of subjects to various dosing regimens is shown in Table 8. All planned cohorts were completed.

TABLE 8

| Cohort | Dose (mg/kg) | Number of subjects |
|---|---|---|
| Part 1 | | |
| 1 | 0.3 | 6 active; 2 placebo |
| 2 | 0.75 | 6 active; 2 placebo |
| 3 | 1.8 | 6 active; 2 placebo |
| 4 | 4 | 6 active; 2 placebo |

TABLE 8-continued

| | | |
|---|---|---|
| 5 | 7 | 6 active; 2 placebo |
| 6 | 10 | 6 active; 2 placebo |
| Part 2 | | |
| Lidocaine evaluation | 4 | 14 active |
| Part 3 | | |
| Cohort | Dose (mg/kg/day) QD for 7 days | Number of subjects |
| 1 | 2.5 | 7 active; 2 placebo |
| 2 | 5 | 8 active; 2 placebo |
| 3 | 10 | 8 active; 2 placebo |

Eligible subjects were adults of either sex ages 18 to 50. Inclusion criteria were: 1) weight ≥50 kg (110 lbs.) and ≤100 kg (220 lbs.); 2) body mass index (BMI) of 19-32 kg/m$^2$; 3) willing to abstain from alcohol consumption for a period of 2 days prior to and during the study; 4) sexually active women of child bearing potential and sexually active men must utilize 2 highly effective contraceptive methods during the study and for a period of time after the study; 5) abstain from caffeinated beverages; 6) normal vital signs at rest; and 7) the ability to provide written informed consent. Exclusion criteria were: 1) subjects who are study site employees, or immediate family members of a study site or sponsor employee; 2) participation in a clinical research study within the previous 90 days; 3) any medical condition or medical history that, in the opinion of the investigator or sponsor, would interfere with the subject's ability to participate in the study or increase the risk of participation for that subject; 4) any screening laboratory test with an abnormal result that is grade 1 (mild) or greater; 5) abnormal ECG (defined as any screening or baseline QTc>450 msec, PR>200 msec, or ventricular and/or atrial premature contractions that are more frequent than occasional, and/or as couplets or higher in grouping; 6) an abnormal cardiovascular exam including a confirmed elevated blood pressure at screening (systolic greater than 140, diastolic greater than 90) after 5 minutes of supine rest, tachycardia>100 bpm after 5 minutes of supine rest; 7) family or personal history of sudden death or QT prolongation; 8) use of prescription, over-the-counter (OTC) medications or herbal supplements, with the exception of acetaminophen and non-oral hormonal contraception, for a period of 7 days prior to and during the study; 9) inadequate muscle mass to receive IM injections; 10) history of alcohol or drug abuse within the previous year, or current evidence of substance dependence or abuse; 11) current smokers or history of smoking within the last 12 months; 12) serious adverse reaction or serious hypersensitivity to any drug; 13) presence or history of clinically significant allergy requiring treatment, as judged by the investigator. Hay fever is allowed unless it is active; 14) donation or loss of greater than 400 mL of blood within the previous 3 months; 15) positive serology for hepatitis B surface antigen, hepatitis C antibody, or human immunodeficiency virus (HIV) type 1; 16) pregnant or nursing females; and 17) male subjects with pregnant female partners.

The plasma concentration time profile of Compound A was determined for each subject in part 3 (results expressed as ng/ml Compound A). Blood samples were taken on Day 1 prior to administration of the first dose and at 1, 2, 3, 4, 6, 8, 10, 12, 16 and 24 hours after administration of the first dose of Compound A and on Day 7 prior to administration of the last dose of Compound A and at 1, 2, 3, 4, 6, 8, 10, 12, 16, 24, 36, 48, 72 and 96 hours after administration of the last dose of Compound A. Plasma samples were obtained from the blood samples and the concentration of Compound A determined.

Figure 1B:
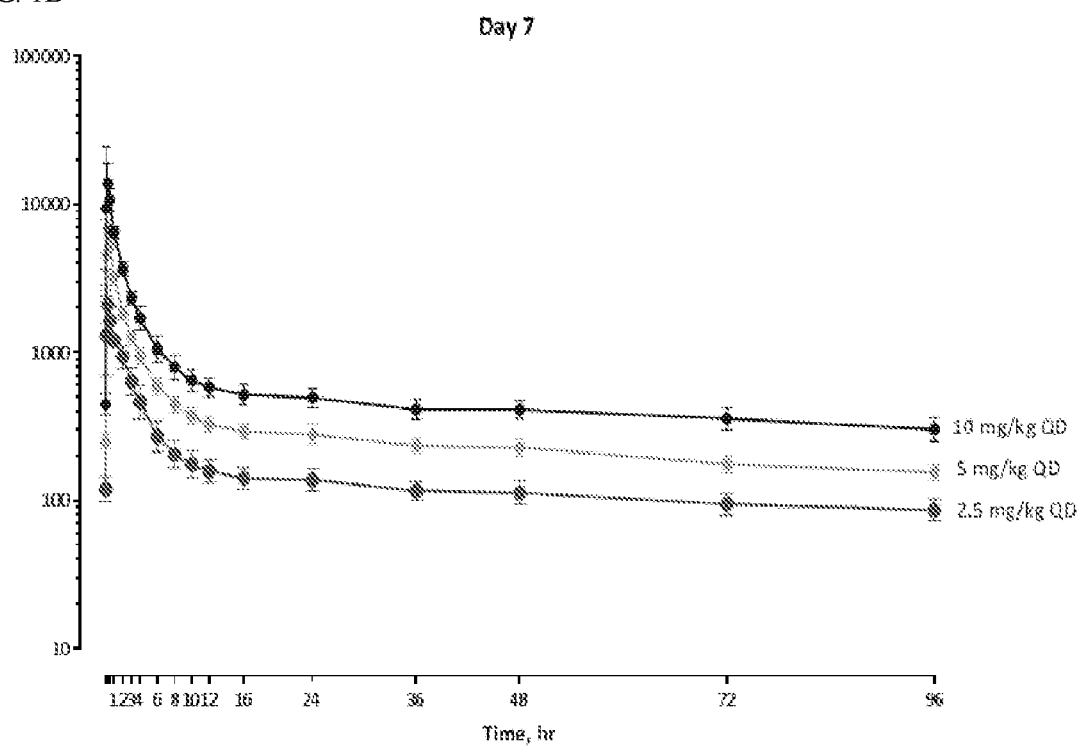
FIG. 1B shows the plasma PK profile of Compound A administered to human subjects by IM injection following the last dose of Compound A on day 7 (results expressed as ng/ml Compound A).

The results are shown in FIG. 1A for Day 1 and FIG. 1B for Day 7. The results are shown as geometric mean (95% CI) and expressed as ng/ml Compound A. As can be seen in FIGS. 1A and 1B, exposure was dose-proportional and linear with increasing dose. Plasma concentrations of Compound A were maximal 1 to 2 hours after administration. On Days 1 and 7, over the multiple dose range of 2.5-10.0 mg/kg, AUC from time 0 to the end of the dosing interval ($AUC_{tau}$) demonstrated dose proportionality; the increase in $C_{max}$ with dose was modestly greater than dose proportional with the power model and consistent with dose proportionality with the ANOVA model. Overall, there was an approximately 1.5-fold increase in exposure (AUC) with repeat dosing for 7 days. Assessment of trough concentrations of Compound A suggested that steady state had not been achieved by Day 7. PK parameters for Part 3 are shown in Table 9.

TABLE 9

| | Compound A IM QD | | | | | |
|---|---|---|---|---|---|---|
| | 2.5 mg/kg N = 7 | | 5.0 mg/kg N = 8 | | 10.0 mg/kg N = 8 | |
| PK Parameter | Day 1 | Day 7 | Day 1 | Day 7 | Day 1 | Day 7 |
| $C_{max}$ (ng/mL)$^a$ | 1820 (18.7) n = 7 | 2390 (39.0) n = 7 | 6840 (12.6) n = 8 | 6900 (17.4) n = 8 | 11400 (25.3) n = 8 | 17500 (83.3) n = 7 |
| $T_{max}$ (h)$^b$ | 0.25 (0.08, 0.50) n = 7 | 0.25 (0.10, 0.52) n = 7 | 0.25 (0.25, 0.50) n = 8 | 0.25 (0.08, 0.25) n = 8 | 0.25 (0.25, 0.25) n = 8 | 0.25 (0.08, 0.50) n = 7 |
| $C_{tau}$ (ng/mL)$^a$ | 33.6 (23.9) n = 7 | 138 (19.1) n = 7 | 68.4 (15.9) n = 8 | 280 (17.8) n = 8 | 134 (15.7) n = 8 | 494 (16.6) n = 7 |
| $AUC_t$ (ng*h/mL)$^a$ | 4830 (16.9) n = 7 | 15100 (16.1) n = 7 | 12100 (11.6) n = 8 | 32500 (11.5) n = 8 | 21600 (10.1) n = 8 | 62100 (13.9) n = 7 |

TABLE 9-continued

| | Compound A IM QD | | | | | |
|---|---|---|---|---|---|---|
| | 2.5 mg/kg N = 7 | | 5.0 mg/kg N = 8 | | 10.0 mg/kg N = 8 | |
| PK Parameter | Day 1 | Day 7 | Day 1 | Day 7 | Day 1 | Day 7 |
| $AUC_{tau}$ (ng*h/mL)$^a$ | 4830 (17.0) n = 7 | 7620 (17.0) n = 7 | 12100 (11.6) n = 8 | 17600 (10.3) n = 8 | 21700 (10.1) n = 8 | 34500 (13.6) n = 7 |
| t1/2 (h)$^a$ | NR | 104 (15.9) n = 7 | NR | 85.7 (17.3) n = 8 | NR | 113 (26.4) n = 7 |

Abbreviations: $AUC_t$ = area under the concentration-time curve from time 0 to time "t";
$AUC_{tau}$ = area under the concentration-time curve from time 0 to the end of the dosing interval;
$C_{max}$ = maximum concentration;
$C_{tau}$ = trough concentration;
CV = coefficient of variation;
IM = intramuscular;
max = maximum;
min = minimum;
NR = not reported;
PK = pharmacokinetic;
QD once daily;
t1/2 = half-life;
$T_{max}$ = time to $C_{max}$.
$^a$Data reported as geometric mean (CV % of geometric mean)
$^b T_{max}$ reported as median (min, max)
Note:
Compound A was administered QD IM with 20 mg of lidocaine over 7 days. NR = not calculated due to 24 hours not being a reliable time frame from which to estimate half-life and any related parameters.

For both Part 1, Part 2, and Part 3 Compound A was generally safe and well tolerated and no serious or severe adverse events occurred, and no clinically significant laboratory abnormalities occurred at any dose. Co-administration of lidocaine with Compound A was found to ameliorate injection site pain, without altering the plasma PK profile of Compound A (data not shown).

Example 4—Intravenous Administration of Compound a in Human Subjects

The agent used in this Example was compound A (the compound of formula I, where A is $NH_2$ and B is H as the HCL salt). A phase 1 double-blind, placebo-controlled, single ascending dose study was conducted to evaluate the safety, tolerability, and pharmacokinetics of Compound A administered by intravenous (IV) administration in healthy human subjects. Four cohorts were administered the study drug at the following doses: 5 mg/kg, 10 mg/kg, 15 mg/kg, and 20 mg/kg. Eight subjects received a single IV dose per cohort (6 subjects received Compound A; 2 subjects received matching placebo). Subject dosing was staggered as a safety precaution.

Preliminary PK results are shown in Table 10. The plasma PK concentration-time profile of Compound A at all doses was characterized by an initial rapid distribution and clearance phase, and a slow terminal clearance phase. Following single IV doses, Compound A $C_{max}$, AUC from time 0 to time t ($AUC_t$), and AUC extrapolated to infinite time ($AUC_{inf}$) values increased in dose-proportional manner over the entire range of 5-20 mg/kg. The inter-subject variability in exposure ($C_{max}$ and AUC) was low, as reflected in the geometric mean coefficients of variance (CVs) on these parameters. No subjects met any stopping criteria for any cohort. Table 10 shows preliminary geometric mean (% coefficient of variation) of plasma PK parameters following administration of a single IV dose of Compound A

TABLE 10

| | Study Cohort (N = 6) | | | |
|---|---|---|---|---|
| | 5 mg/kg | 10 mg/kg | 15 mg/kg | 20 mg/kg |
| $AUC_{24}$ (ng*h/mL) | 10950 (10.4) | 21070 (14.1) | 34370 (17) | 44770 (8.6) |
| $AUC_t$ (ng*h/mL) | 17100 (23.5) | 32400 (15.6) | 59900 (20.7) | 73400 (14.3) |
| $AUC_{0-inf}$ (ng*h/mL) | 21200 (26.3) | 37100 (13.3) | 65900 (20.7) | 81200 (14.6) |
| $C_{max}$ (ng/mL) | 5540 (7.6) | 10300 (21.4) | 17700 (16.3) | 20500 (16.4) |
| $t_{1/2}$ (h) | 111 (39.2) | 114.5 (20.2) | 182.5 (20.7) | 133.5 (33.4) |
| CL (L/h) | 17.1 (19.7) | 20.7 (12.0) | 16.7 (13.1) | 17.9 (14.0) |
| Vz (L) | 2725 (22.0) | 3049 (21.8) | 4138 (19) | 4010 (21.4) |

Abbreviations: $AUC_t$ = area under the concentration-time curve from time 0 to time "t", with time "t" ranging from 120 h to 480 h; $AUC_{inf}$ = area under the concentration-time curve from time 0 to infinite time; $C_{max}$ = maximum concentration; CV = coefficient of variation; IV = intravenous; PK = pharmacokinetic; $t_{1/2}$ = half-life; Vz = volume of distribution; Cl = clearanceData reported as geometric mean and CV %

Compound A was generally safe and well tolerated. No safety signals were detected. Two subjects experienced a serious adverse event (SAE). The SAEs were considered not related to study drug by the investigator.

Example 5—Intravenous Administration of Compound a in Human Subjects with YFV-AVD The agent used in this Example was compound A (the compound of formula I, where A is $NH_2$ and B is H as the HCL salt). Compound A was administered to two subjects at risk for risk of developing YFV-AVD for monitored compassionate use.

Subject 1

Subject 1 was a 47-year-old male who was administered yellow fever vaccine. Subject 1 had previously undergone a thymectomy. Subject 1 developed significant YFV-AVD on day 5 after receiving the yellow fever vaccine and was admitted to hospital. On day 9, Subject 1 exhibited renal impairment and continuous venovenous hemofiltration (CVVH) was initiated. On day 10, Subject 1 was on full supportive care in the ICU; CVVH was maintained. On day 12, administration of Compound A was initiated. As Compound A is eliminated almost exclusively by renal excretion, the dose was adjusted for Subject 1 due to renal impairment. Subject 1 was administered Compound A as follows: 10 mg/kg loading dose followed by 2 mg/kg maintenance doses q12h. The 10 mg/kg loading dose was administered as a single 1-hour IV infusion. Each maintenance dose was administered as a single 60-minute IV infusion. Subject 1 died on day 15 due to complications from YFV-AVD (after receiving 7 doses of Compound A). Administration of Compound A was generally safe and well tolerated. No clinical or biochemical adverse effects of Compound A were detected over 4 days of treatment.

The concentration of Compound A in plasma was determined as generally as described in Example 6. The plasma concentration of Compound A, as well as a comparison of the actual Compound A concentration as compared to the predicted Compound A concentration using the PK model described in Example 2 are shown in Table 11. The $C_{max}$ was slightly underpredicted for the first maintenance dose of 5 mg/kg, but otherwise Compound A concentrations were well predicted by the model.

TABLE 11

| Time Point Collected (h) | Actual Compound A Concentration (ng/mL) | Simulated Compound A Concentration (ng/mL) |
| --- | --- | --- |
| 1 (immediately following 10 mg/kg infusion) | 11800 | 7000 |
| 4 | 2710 | 2700 |
| 8 | 1300 | 1100 |
| 12 | 668 | 590 |
| 13 (immediately following 2 mg/kg infusion) | 2930 | 1800 |
| 24 | 449 | 502 |
| 48 | 384 | 564 |
| 72 | 410 | 649 |

Subject 2

Subject 2 was a 74-year-old male (weight 69 kg) who was given yellow fever 17D vaccine. Subject 2 had previously undergone a thymectomy. Blood count and biochemistry were normal, including liver tests and renal function at the time the initial loading dose was administered (Creatinine 80 μmol/L, eGFR 86 mL/min.).

Subject 2 was administered Compound A as follows: 20 mg/kg loading dose followed by 5 mg/kg maintenance doses q12h×15 doses. On day 5, the maintenance dose was lowered to 2 mg/kg due to decreased blood creatinine (105 μmon; eGFR 62 ml/min) and slight lowered platelet (136) and lymphocyte (0.96) counts (although they were both towards the lower end of normal at baseline; 150 and 1.5 respectively). This lowered maintenance dose was used through day 8. The 20 mg/kg loading dose was administered as 2, 1-hour 10 mg/kg IV infusions. Each maintenance dose was administered as a single 60-minute IV infusion. Administration of Compound A was generally safe and well tolerated. No serious adverse events were reported.

The concentration of Compound A in plasma was determined as generally as described in Example 6. The plasma concentration of Compound A, as well as a comparison of the actual Compound A concentration as compared to the predicted Compound A concentration using the PK model described in Example 2 are shown in Table 12. As shown below, the modeled exposures were highly predictive of the actual drug exposure in Subject 2. The $C_{max}$ was slightly underpredicted for the first maintenance dose of 5 mg/kg, but otherwise Compound A concentrations were well predicted by the model.

TABLE 12

| Time Point Sample Collected (hours post first administration) | Actual Compound A Concentration (ng/mL) | Simulated Compound A Concentration (ng/mL) |
| --- | --- | --- |
| 2 (immediately following 2 1-h 10 mg/kg infusions) | 12200 | 11775 |
| 4 | 4080 | 5238 |
| 8 | 1080 | 1033 |
| 12 | 454 | 474 |
| 13 (immediately following 5 mg/kg infusion) | 6340 | 3952 |
| 24 | 417 | 383 |
| 48 | 483 | 452 |
| 72 | 484 | 508 |
| 96 | 580 | 552 |
| 120 (dose reduced to 2 mg/kg) | 518 | 480 |
| 144 | 521 | 440 |
| 192 | 479 | 382 |

Example 6—Administration of Compounds A in SARS-CoV-2 Hamster Model

In this example, the SARS-CoV-2 hamster model was used to investigate the antiviral activity of Compound A. The agent used in this Example was compound A (the compound of formula I, where A is $NH_2$ and B is H as the HCL salt).

The SARS-CoV-2 hamster model of infection exhibits rapid and robust viral replication kinetics with a peak in oropharyngeal (OP) swab viral RNA levels detected at Day 1 (+24 hr). Male and Female Syrian golden hamsters (N=56) with an average weight of ~145 g were housed in ventilated cages (4 per cage) in a BSL3 facility. Hamsters were implanted with a thermal-sensitive microchip during the 6-7 day acclimatization period prior to virus challenge for identification and to monitor body temperature. Compound A was supplied as a powder (BioCryst Pharmaceuticals; Inc.) and reconstituted in Lactated Ringers, USP for injection. The dihydrochloride salt contained 77.5% Compound A and was diluted to achieve treatment doses. Vehicle control was Lactated Ringers, USP for injection.

Hamsters were challenged via intranasal instillation of 100 μl containing $10^4$ plaque forming units (PFU) of SARS-CoV-2 (WA1/2020 isolate; 2 passages from original resource stock) on Day 0 under ketamine-xylazine anesthesia. A total of 4 groups of 8 animals each, with equal numbers of male and female animals per group, were treated with Compound A or vehicle control as shown in Table 13. Compound A and vehicle control were administered by intraperitoneal injection twice daily (12-hour intervals) as shown in Table 13 (as Group 3 received the first dose at +24 hours post-infection and were sacrificed on Day 7, these animals received only 6 days of treatment). The dose administered at each time point was 100 mg/kg in 0.1 ml volume.

TABLE 13

| Group | n | Treatment | Treatment Days | Dose (total daily) | Time of 1$^{st}$ dose relative to infection |
|---|---|---|---|---|---|
| 1 | 8 | Compound A | −1 to +6 7 days | 100 mg/kg BID (200) | −24 hours |
| 2 | 8 | Compound A | 0 to +6 7 days | 100 mg/kg BID (200) | +1.5 hours |
| 3 | 8 | Compound A | +1 to +6 6 days | 100 mg/kg BID (200) | +24 hours |
| 4 | 8 | Vehicle | 0 to +6 7 days | BID | +1.5 hours |

Animals were monitored once daily for clinical monitoring, including recording of body weight and temperature beginning two days prior to virus challenge until euthanasia. OP swabs were collected prior to virus challenge and on days +1, +2, and +3. The samples were collected in viral transport medium, frozen, and assayed for virus by plaque assay on Vero E6 cells and qRT-PCR. 4 hamsters per subgroup (2 males and 2 females) were euthanized on days +3 and +7, with the following sample collection and analyses: (i) on day +3 collection of turbinates and cranial and caudal lobes of lung for virus titration (plaque assay and qRT-PCR), and formalin fixation of trachea, left lung, cranial lung, medial lung, and heart for histopathology; and (ii) on day +7 formalin fixation of trachea, left lung, cranial lung, medial lung, and heart for histopathology. Tissues collected for histopathology was processed to obtain standard H&E-stained sections that were evaluated by a board-certified veterinary pathologist using the following scoring system (0 indicating no lesion or no change from normal and higher values indicating increased severity of change): overall lesion extent: 0-4; bronchitis: 0-5; alveolitis: 0-5; pneumocyte hyperplasia: 0-5; vasculitis: 0-5; interstitial inflammation (lung) or Inflammation (non-lung tissues): 0-5; TOTAL SCORE: 0-29. Lung tissue histology analyses were performed on left, cranial (right), or medial (right) tissue as indicated.

Results

Figure 2:
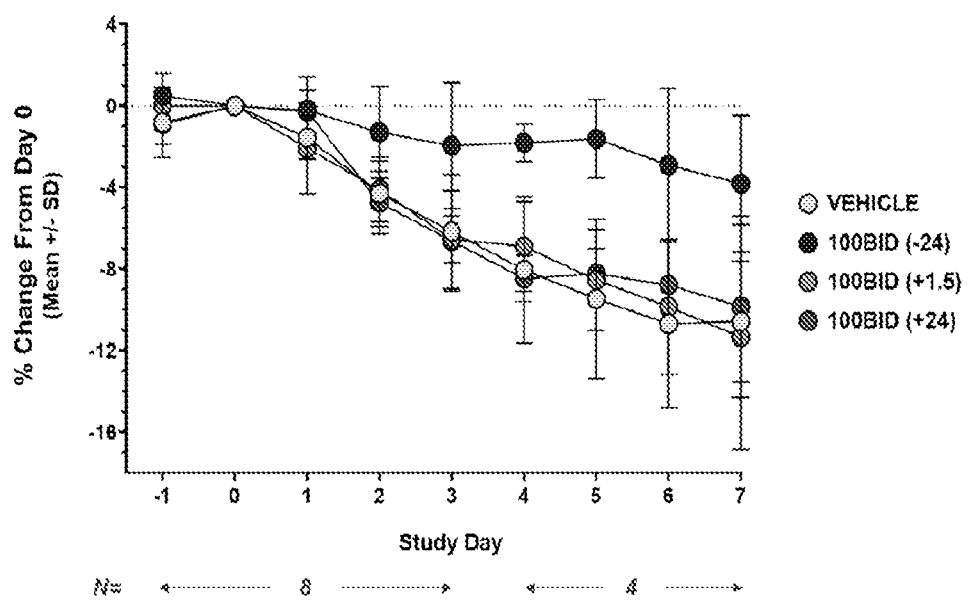
FIG. 2 shows administration of Compound A reduced weight loss over time in an in vivo hamster model of SARS-CoV-2 infection.

Weight change from Day 0, a surrogate for antiviral activity, was evaluated across treatment groups and shown in FIG. 2. Compound A administered as 100 mg/kg BID beginning at −24 hr relative to infection (Group 1) showed the lowest level of weight change over time indicative of protection from disease progression and consistent with the virology data described below. Treatment with Compound A in Group 1 was associated with <5% weight loss. Clinical scores suggest no adverse impact associated with Compound A dosing in Groups 1-3. Similarly, daily temperatures were similar across Groups 1-4 varying +/−1° F.

Figure 3:
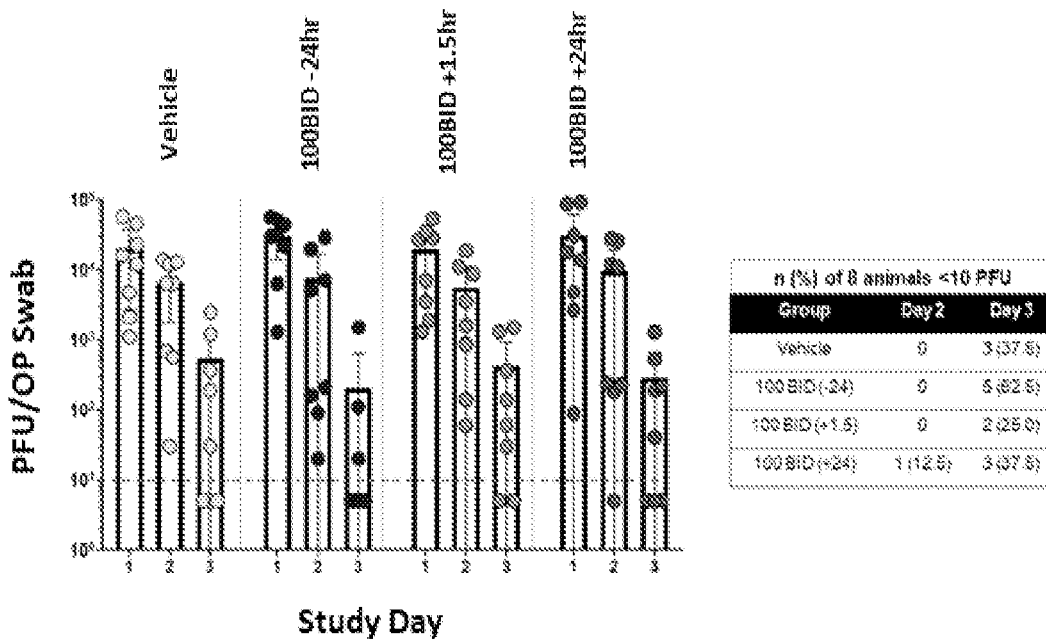
FIG. 3 shows administration of Compound A reduced viral burden in oropharyngeal swabs in an in vivo hamster model of SARS-CoV-2 infection.

SARS-CoV-2 replication competent virus was quantified in OP swabs collected at Days 1, 2, and 3 post-infection. The results are shown in FIG. 3. The viral burden (i.e., PFU/OP swab) at Day 3 in vehicle control animals was comparable to prior studies using this model; N=10 animals, mean 856, minimum 310, maximum 1500 PFU/OP swab at Day 3. The viral burden decreased in all groups over the course of the sampling period. Female animals tended to have lower PFU/OP swab than male animals across all groups. As shown in the table to the right of FIG. 3, there were more animals that achieved PFU<10, the lower limit of quantification, in Group 1 (⅝ or 62.5%) than the other treatment groups.

Figure 4:
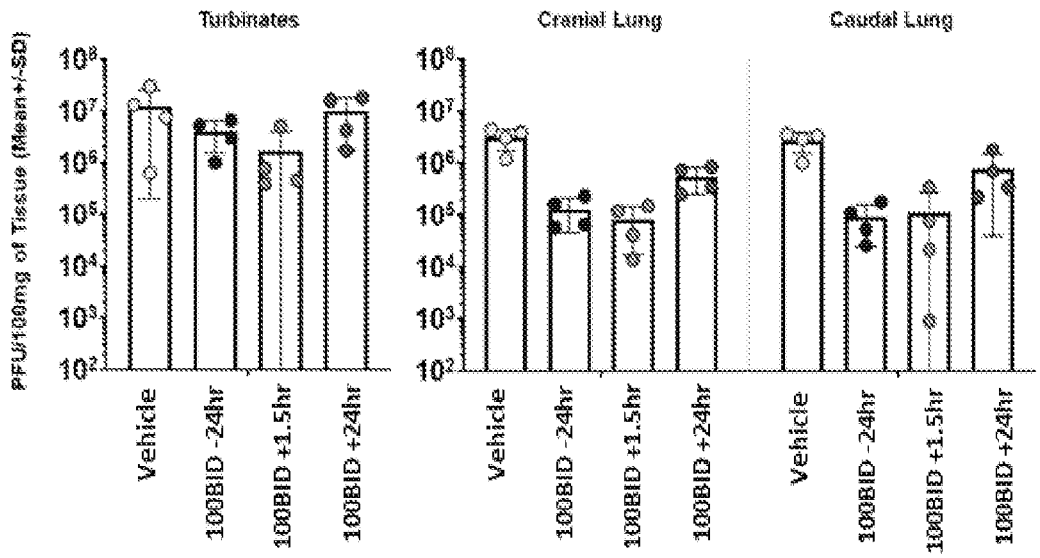
FIG. 4 shows administration of Compound A reduced viral burden in lung tissue in an in vivo hamster model of SARS-CoV-2 infection.

A higher viral burden (i.e., PFU/100 mg of tissue) of 2-3 orders of magnitude higher was observed in turbinate and lung tissue at Day 3 post-infection than seen in the OP swabs. Animals in Groups 1 and 2 showed the largest decrease in turbinate and lung tissue viral burden relative to vehicle control. Lung viral burdens in Groups 1 and 2 were ~1.4-1.6 log lower than vehicle control and were ~0.66 log lower than vehicle control in Group 3 as shown in FIG. 4.

Figure 5:
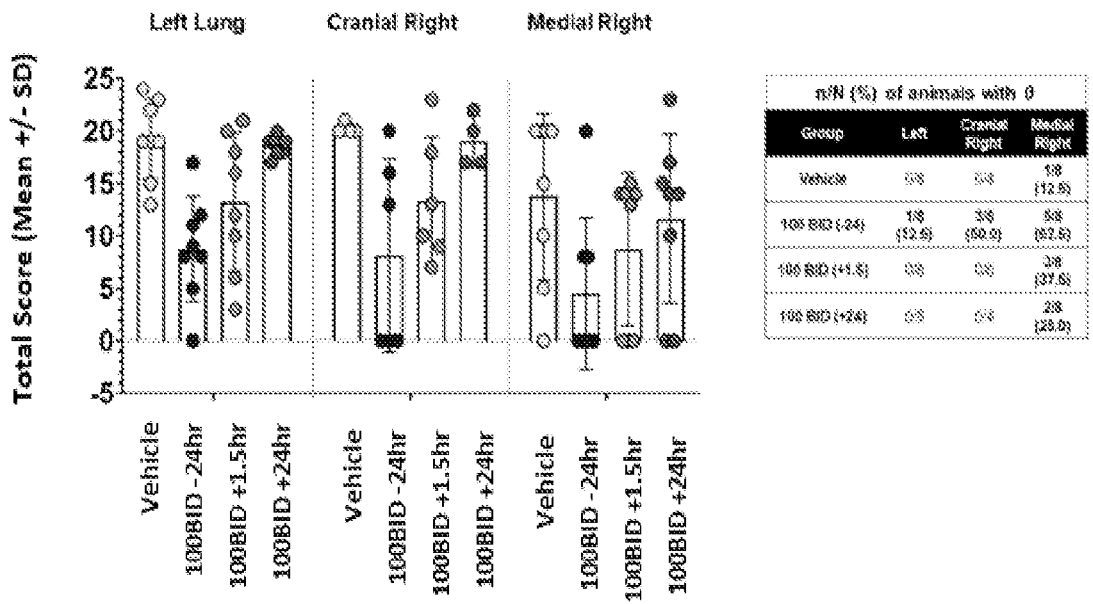
FIG. 5 shows administration of Compound A reduced lung tissue damage in an in vivo hamster model of SARS-CoV-2 infection.
Figure 6:
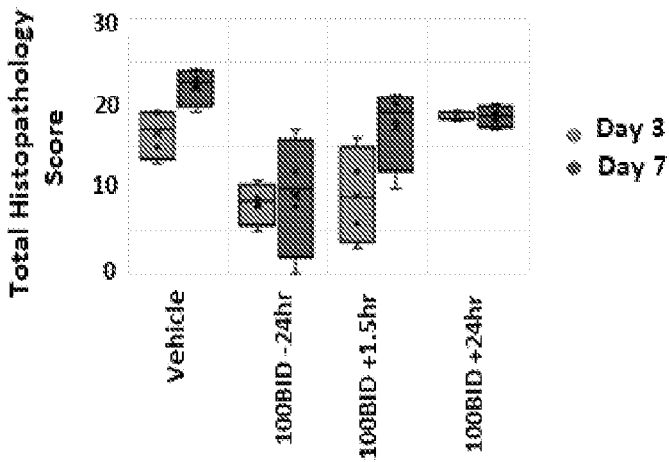
FIG. 6 shows administration of Compound A decreased the severity of lung tissue damage over time in an in vivo hamster model of SARS-CoV-2 infection.

Total histology scores for individual animals and the group mean +/−SD are shown in FIG. 5. Data include samples from Days +3 and +7. In addition, the table to the right of the graph shows the percentage of samples with a score of 0, indicative of normal tissue histology. Animals in Group 1 showed reduced/no tissue histopathology as compared with vehicle control (Group 4) Animals in Group 2 showed reductions relative to vehicle control (Group 4) but to a lesser degree while animals in Group 3 were similar to vehicle control (Group 4). When the lung histology data are plotted by day of necropsy, the protective effect of 100 BID-24 administration (Group 1) is more pronounced. FIG. 6 shows data from left lung samples. Tissue damage, as per the total histology scores, in the vehicle control (Group 4) worsened from Day +3 to +7 whereas the total histology scores on Day +3 to +7 were similar for Group 1 animals (FIG. 6). Tissue scores were lower in trachea samples than in the lung but a similar pattern of protection from tissue injury was observed (data not shown). Tissue injury from heart tissue was unremarkable (data not shown). In summary, histology showed a high degree of protection from tissue injury in Group 1 animals relative to vehicle control (Group 4) at Days +3 and +7. Lower levels of protection from tissue injury at Days +3 and +7 were observed in Group 2 relative to vehicle control.

In summary, treatment with Compound A reduced weight loss, reduced tissue viral burden, and reduced tissue injury in the SARS-CoV-2 hamster model with no adverse impact associated with Compound A dosing.

Example 7—Clinical Trial of Compound in Human Subjects With COVID-19

The agent used in this Example was compound A (the compound of formula I, where A is $NH_2$ and B is H as the HCL salt). Example 7 describes a randomized, double-blind, placebo-controlled dose-ranging study to evaluate the safety of Compound A administered via IV infusion versus placebo in adult subjects with COVID-19. The clinical study was designed to be conducted in two parts, however only Part 1 was completed. Part 1 enrolled 8 subjects in each of 3 cohorts as described below (3:1 randomization of Compound A: placebo in each cohort). Part 2 was designed to enroll up to 42 subjects (expansion cohort; 2:1 randomization of Compound A: placebo in each cohort) for a total of up to 66 subjects with COVID-19. There were no protocol specified food or drink restrictions. Doses were selected for this study based on the Phase 1 clinical study of Compound A administered via IM injection to healthy adults (as described in Example 1) and PK modeling of efficacious exposures in animal models.

Inclusion/Exclusion Criteria

All subjects were required meet the following inclusion criteria to be eligible for participation in the study:

(1) Ability to provide written informed consent, accept randomization to any assigned treatment arm, and comply with planned study procedures:

(2) Males and nonpregnant, non-breast-feeding females, aged 18 years or older;

(3) Contraception requirements for male and female participants. If the female subject is of childbearing potential, she must have a negative serum pregnancy test at screening. A woman is considered of child bearing potential unless postmenopausal >2 years without menses, or is postmenopausal ≤2 years and has FSH >40 mIU/mL, or is surgically sterilized via bilateral oophorectomy, hysterectomy, bilateral tubal ligation, or successful Essure placement with documented confirmation test at least 3 months after the procedure. If the female subject is of childbearing potential, she must agree to practice abstinence, exclusively have female partners, or use acceptable contraception during the study and for 30 days after the last dose of study drug. If the female subject reports being postmenopausal for ≤2 years and has a follicle-stimulating hormone (FSH)≤40 mIU/mL, she must agree to use at least one acceptable effective contraceptive method (as proposed above) during the study and for 30 days after the last dose of study drug. Male subjects must comply with the following requirements through the end of the study. If the male subject has female partners of childbearing potential, he must agree to utilize at least one acceptable effective contraceptive method as defined below. Male subjects who declare themselves as sexually abstinent or who exclusively have male partners are acceptable for the purposes of this study. Acceptable contraception methods for male and female subjects include the following: an intrauterine device (IUD) or intrauterine system (IUS) (implanted any time prior to screening), any form of hormonal contraception, use of male or female condom with or without spermicidal foam/gel/film/cream/suppository, use of an occlusive cap (diaphragm, or cervical/vault caps) with spermicidal (foam/gel/film/cream/suppository), or monogamous relationship with a vasectomized partner (or for males, have had a vasectomy);

(4) Subject weight ≥50 kg (100 lb.)

(5) Clinical syndrome consistent with moderate-severe (but not critically ill) COVID-19, defined by at least one of the following: (A) symptoms of acute viral lower respiratory tract infection, such as fever, non-productive cough, dyspnea, and either (i) a pulse oximetry oxygen saturation (SpO2)≤94% or a respiratory rate >24 breaths/minute as measured at rest without use of supplemental oxygen, or (ii) a clinical requirement for supplemental oxygen treatment or non-invasive mechanical ventilation; or (B) radiographic pulmonary findings seen on chest imaging (chest X-ray or CT scan) consistent with COVID-19, such as patchy ground-glass opacities, honeycomb-like interlobular thickening, areas of subsegmental or segmental consolidation;

(6) Positive test for SARS-CoV-2 by molecular amplification of the virus in a respiratory specimen (nasopharyngeal, oropharyngeal, lower respiratory tract [e.g., expectorated sputum]) collected <96 hours prior to randomization; and (7) Subject has been admitted to the hospital for the clinical management of COVID-19, as per local medical practice standards All subjects were required not meet any of the following exclusion criteria to be eligible for participation in the study:

(1) Any clinically significant medical condition or medical history that, in the opinion of the investigator or sponsor, would interfere with the subject's ability to participate in the study or increase the risk of participation for the subject;

(2) Lack of venous access, including the absence of suitable peripheral veins for venipuncture/cannulation and the inability or contraindication to obtain central venous access, as assessed by the investigator at Screening;

(3) Participation in any other investigational drug or vaccine study currently or within the past 30 days;

(4) A clinical treatment plan that would include concomitant administration of any other experimental treatment or off-label use of marketed medications that are intended as specific treatment for the COVID-19 clinical syndrome or the SARS-CoV-2 infection (any such medications must be discontinued prior to study enrollment, unless a formal written standard of care policy document from the national, state, or institutional authorities requires otherwise);

(5) Severe or rapidly progressive disease or medical condition of any type such that death is an expected or likely outcome within 72 hours or that would require referral or transfer to another medical facility;

(6) Severe renal impairment estimated glomerular filtration rate (eGFR)≤50 mL/min/1.73 m$^2$) or receiving continuous renal replacement therapy, hemodialysis, or peritoneal dialysis;

(7) Severe liver disease by medical history or ALT or AST ≥5 times upper limit of normal);

(8) Congestive heart failure by medical history ≥Class 3; and (9) Requiring invasive mechanical ventilation or extracorporeal membrane oxygenation (ECMO) at the time of randomization.

Part 1

Part 1 of the clinical study enrolled hospitalized subjects who have been diagnosed with COVID-19 by PCR. Eligible subjects were determined to meet the COVID-19 clinical syndrome definition as described in the inclusion criteria. Subjects in Part 1 were randomized and dosed as soon as screening assessments were completed.

The safety of loading/maintenance dosing regimens of Compound A administered IV for 7 days to cohorts of subjects was evaluated. The dosing regimen for the three cohorts is described in Table 14 below.

TABLE 14

| Cohort | Route of Administration | Loading Dose | Maintenance Dose |
|---|---|---|---|
| 1 | IV | 10 mg/kg | 2 mg/kg q12 h (BID) |
| 2 | IV | 10 mg/kg | 5 mg/kg q12 h (BID) |
| 3 | IV | 20 mg/kg | 5 mg/kg q12 h (BID) |

12 hours after the initial loading dose, subjects were given a 60-minute IV infusion of blinded study drug or placebo q12h for 7 days (a total of 13 maintenance doses). Each cohort of Part 1 enrolled 8 total subjects randomized to receive either Compound A (n=6) or placebo (n=2). Ascending dose cohorts in Part 1 were enrolled sequentially. Enrollment of subjects in each sequential higher dose level cohort occurred after completion of a clinical safety review of laboratory, AE, vital sign measurements. ECG, and physical examination data for all subjects up through 96 hours following the final dose. As discussed below, the dosing regimen should be adjusted for renal impairment, including worsening renal impairment that may occur during the study.

Primary and Secondary Objectives and Endpoints

The primary objective of the study was to evaluate the safety of Compound A in subjects with COVID-19. The primary endpoints of the study were safety parameters, including adverse events, laboratory abnormalities, vital sign measurements, ECGs, and physical examination findings.

The secondary objectives of the study were as follows: (1) to evaluate the effect of Compound A on the clinical course of subjects with COVID-19; (2) to evaluate the antiviral effect of Compound A on SARS-CoV-2 in the respiratory tract of subjects with COVID-19; and (3) to describe the PK of Compound A in subjects with COVID-19, if possible. The secondary endpoints of the study were as follows: (1) changes from baseline in clinical status and time to improvement over baseline, using the 8-point ordinal scale as determined at the first assessment of each study day (for the previous 24 hours ending at midnight) through Day 21; (2) changes from baseline and time to improvement over baseline or discharge from the hospital, using the National Early Warning Score (NEWS) as determined by the first assessment of each study day through Day 21; (3) all-cause mortality at Day 21 and Day 56; (4) qualitative and quantitative changes from baseline, and time to undetectable status in SARS-CoV-2 nuclei acid as measured by PCR in respiratory specimens (nasopharyngeal, oropharyngeal, lower respiratory tract) through Day 21; and (5) plasma PK parameters for Compound A, if possible.

Administration of Study Drug

Compound A or placebo in lactated Ringer's (LR) solution was administered IV via a peripheral venous catheter inserted into the arm of the subject. Study drug will be infused over 60 minutes via programmable infusion pump.

In the event that an infusion was stopped in the middle of dosing for a subject for safety reasons, the subject did not contribute to the PK population, and was removed from further dosing, but continued to be followed for safety assessments per protocol. If the infusion was stopped for a non-drug related issue, the subject skipped that dose and dosing resumed at the next scheduled dose, providing the issue can be resolved. Subjects were allowed to miss two non-consecutive doses of Compound A after the loading dose is administered and still be considered evaluable. A 2-hour window around the nominal dose time was allowed.

Compound A for IV infusion is a sterile, nonpyrogenic solution of 100 mg per 1 mL (100 mg/mL) with a pH adjusted to 3.0. Excipients include sterile water for injection United States Pharmacopeia (USP)/EP, hydrochloric acid NF/EP or sodium hydroxide NF/EP may be used for pH adjustment. Compound A for IV infusion was supplied in 2 mL single-use amber vials fitted with rubber stoppers and aluminum flip-off seals. Each 2-mL vial contains a fill volume of 1.2 mL.

LR solution for Injection, USP will be used as the placebo. The volume for infusion matched the volume used in the respective active cohort.

Dose Adjustment for Decreased Renal Function

Compound A is eliminated primarily by renal excretion. Subjects in Group B may be enrolled in this study with an eGFR >50 mL/min/1.73 m$^2$. Subjects with CrCl of 60 mL/min or higher will receive the doses for the cohort as described in Section 7.1. Modeling and simulations of exposure of Compound A in scenarios where renal clearance has been reduced indicates that exposure of Compound A is increased when the CrCl is less than 50 mL/min.

As COVID-19 may lead to worsening organ function, renal function was measured daily by assessing CrCl. If CrCl dropped below 50 mL/min, an appropriate dose reduction was evaluated prior to the next dosing period. Based on simulations of reduced renal clearance, doses were reduced as described in Table 15. If a subject required hemodialysis, study drug was administered after dialysis occurs if possible. If a subject was placed on continuous venovenous hemofiltration, the appropriate recommendation for dose adjustment was utilized from Table 15, dependent on the estimated creatinine clearance.

TABLE 15

| | Creatinine Clearance | |
|---|---|---|
| Maintenance dose | 30-50 mL/min | >50 mL/min |
| 2 mg/kg BID | Reduce to 2 mg/kg QD | No dose reduction |
| 5 mg/kg BID | Reduce dose to 2.5 mg/kg BID | No dose reduction |

Assessments

Demographic information, including year of birth, sex, race or ethnicity, and medical and medication history was captured for each subject participating in the study at the screening visit.

For Part 1, antiviral activity was analyzed from respiratory samples collected at the time points indicated in the schedules of assessments in Table 16. Safety was evaluated through assessments of AEs, laboratory analyses (clinical chemistry, hematology, coagulation, and urinalysis), vital sign measurements, ECGs, and physical examinations at the time points indicated in the schedule of assessments in Table 16.

For Part 1, PK parameters were analyzed from plasma samples collected at the time points indicated in the schedule of assessments in Table 16. The severity and transmissibility of SARS-CoV-2 and requirements for personal protective equipment prevented the collection of PK samples. If PK samples can be collected as described, the PK parameters will be analyzed (or analyzed to the extent feasible is PK sample are not collected as described for one or more subjects).

TABLE 16

| | | | | | | | | | | Post Dosing Day | |
|---|---|---|---|---|---|---|---|---|---|---|---|
| | | | | Dosing Day | | | | | | Day 21 + 2 | Telephone Follow Up[c] |
| Assessment | Screening[a] | 1[b] | 2 | 3 | 4 | 5 | 6 | 7 | 11 and 15[n] | (or Early Termination)[n] | Days 35, 49, and 56 (+2) |
| Informed consent | X | | | | | | | | | | |
| Inclusion/exclusion criteria | X | | | | | | | | | | |
| Demographics | X | | | | | | | | | | |

TABLE 16-continued

| | | Dosing Day | | | | | | | | | Post Dosing Day | |
|---|---|---|---|---|---|---|---|---|---|---|---|---|
| Assessment | Screening[a] | 1[b] | 2 | 3 | 4 | 5 | 6 | 7 | 11 and 15[n] | Day 21 + 2 (or Early Termination)[n] | Telephone Follow Up[c] Days 35, 49, and 56 (+2) |
| Medical and medication history | X | | | | | | | | | | |
| Height/weight/BMI | X | | | | | | | | | | |
| Physical examination[d] | X | X | X | X | X | X | X | X | X | X | |
| Vein assessment | X | | | | | | | | | | |
| Vital signs (BP, HR, and temperature)[e] | X | X | X | X | X | X | X | X | | X | |
| ECG[f] | X | X | X | X | X | X | X | X | | X | |
| Pregnancy test (females)[g] | X | X | | | | | | | | X | |
| FSH[h] | X | | | | | | | | | | |
| Hematology, coagulation clinical chemistry, urinalysis | X | X | X | X | X | X | X | X | X | X | X (for clinic visits) |
| UACR | | X | | | X | | | X | | X | |
| Cystatin C[k] | | X | | | X | | | X | | X | |
| Troponin and CK-MB[m] | | X | | | | | | | | X | |
| NGAL[m] | | X | | | | | | X | | X | |
| HBV, HCV, HIV[i] | X | | | | | | | | | | |
| Creatinine clearance | X | X | X | X | X | X | X | X | | | |
| Clinical signs and symptoms | X | X | X | X | X | X | X | X | X | X | X for clinic visits |
| Clinical status-8 Point Ordinal Scale[j] | | X | X | X | X | X | X | X | X | X | |
| NEWS Clinical status[k] | | X | X | X | X | X | X | X | X | X | |
| SARS-CoV-2 PCR test[l] | X | X | X | X | X | X | X | X | X | X | |
| Future Use Sample | | X | | | X | | | X | X | X | |
| Chest X-ray or CT scan | X | | | | | | | | | | |
| Pulse oximetry or oxygen saturation measurement | X | | | | | | | | | | |
| Study drug administration | | X | X | X | X | X | X | X | | | |
| PK sampling[h] | | X | X | X | X | X | X | X | | X | |
| AE assessment | X | X | X | X | X | X | X | X | X | X | X |
| Concomitant medications | X | X | X | X | X | X | X | X | X | X | X |
| Survival assessment | ───────────────────────────────────────────────→ | | | | | | | | | | |
| Hospitalization status | ───────────────────────────────────────────────→ | | | | | | | | | | |

Abbreviations: BMI = body mass index;
BP = blood pressure;
ECG = electrocardiogram;
FSH = follicle-stimulating hormone;
HBV = hepatitis B virus;
HCV = hepatitis C virus;
HIV = human immunodeficiency virus;
HR = heart rate;
NEWS = national early warning score;
PK = pharmacokinetic;
SARS-CoV-2 = SARS coronavirus 2.

[a]Screening should occur as quickly as possible upon hospital admission and diagnosis. The subject may be dosed as soon as screening assessments are completed. Eligible subjects must meet the COVID-19 clinical syndrome definition. In females, a negative serum pregnancy test, must be confirmed prior to dosing to ensure subject meets eligibility criteria.

[b]Screening and Day 1 may occur on the same day, and all screening assessments should be complete prior to dosing. Dosing consists of a loading dose of Compound A followed by 13 maintenance doses of Compound A given every 12 hours. These are nominally designated by days in the schedule of assessments, but it should be noted that dosing can start at any point in the day, and the nominal days noted in this schedule should be adjusted as needed to reflect each subject's actual schedule of dosing to ensure all assessments are completed.

[c]These follow-up visits may be on-site rather than telephone visits if deemed necessary in the judgement of the investigator. If subjects have ongoing AEs or treatment-emergent laboratory findings at Day 21, subjects should return for clinic visits for follow-up visits instead of telephone visits. At those clinic visits, hematology, coagulation, clinical chemistry, and urinalysis should be collected, and subjects should be assessed for any clinical signs or symptoms. Additional assessments may be performed based on the Investigator's
judgement and should be recorded in the CRFs.

[d]A complete physical examination consisting of the head and neck, skin, chest (lungs and heart), abdomen (gastrointestinal tract, liver, spleen and kidneys), back, musculoskeletal system, neurologic system should be conducted at screening, Day 1, Day 7, and Day 21. Breast and genitourinary system do not require examination unless the potential subject indicates a complaint or comorbidity that could result in exclusion. All other physical examinations will be symptom directed. The site of infusion should be checked daily for any changes in skin.

[e]Vital signs (except temperature) will be obtained pre-dose (within 2 hours of dosing), 1 (at end of infusion), 2, 4, and 8 hours post dose on Day 1, and once daily thereafter. Oral temperature will be obtained at 8 hours post dose on Day 1, and once daily thereafter. Subjects should be rested for 10 minutes in the supine position prior to vital sign measurements. Daily vitals may be done as part as the normal daily care for the patient.

[f]ECGs will be performed at screening. The pre-dose ECG should be collected in triplicate at baseline prior to dosing 1-3 minutes apart. Pre-dose ECG should be collected within ≤2 hours of the first dose. Post dose ECGs will be collected at 2 and 4 hours after dosing on Day 1 and daily thereafter.

TABLE 16-continued

| | | | | | | | | | Post Dosing Day | |
|---|---|---|---|---|---|---|---|---|---|---|
| | | | | | | | | | | Telephone |
| | | Dosing Day | | | | | | | Day 21 + 2 | Follow Up[c] |
| Assessment | Screening[a] | 1[b] | 2 | 3 | 4 | 5 | 6 | 7 | 11 and 15[n] | (or Early Termination)[n] | Days 35, 49, and 56 (+2) |

[g]A serum pregnancy test will be administered to women of childbearing potential or who have been postmenopausal ≤2 years at screening; any other pregnancy tests performed during the study may be urine pregnancy tests (for women of childbearing potential only). A negative serum pregnancy test is required prior to dose administration. If Screening and Day 1 occur on the same day, a urine pregnancy test will not be required in addition to the serum pregnancy test. FSH should be tested in all women who report they have been postmenopausal ≤2 years.
[h]PK samples are optional based on severity and transmissibility of the disease and requirements of personal protective equipment when treating subjects with COVID-19.
[i]HIV, HCV and HBV testing will be done at screening. Results are not required prior to initiating treatment, and positive results are not exclusionary.
[j]The 8-point scale is as follows: 1) death; 2) hospitalized, on invasive mechanical ventilation or extracorporeal membrane oxygenation; 3) hospitalized, on non-invasive ventilation or high flow oxygen devises; 4) hospitalized, requiring supplemental oxygen; 5) hospitalized, no requiring supplemental oxygen, but requiring ongoing medical care (COVID-19 related or otherwise); 6) hospitalized, not requiring supplemental oxygen and no longer requiring ongoing medical care; 7) not hospitalized, but requiring home oxygen; 8) not hospitalized, with no requirements for home oxygen.
[k]NEWS is based on 7 clinical parameters as follows: respiration rate, oxygen saturation, use of any supplemental oxygen, temperature, systolic blood pressure and level of consciousness.
[l]Collect a nasopharyngeal swab, oropharyngeal swab and a lower respiratory tract specimen if available (e.g., expectorate sputum if subject spontaneously produces [do not try to induce sputum] or a tracheal aspirate if subject is intubated
[m]NGAL, CK-MB, Cystatin C and troponin do not need to be resulted prior to dosing. These tests should be taken at Baseline pre-dose and post dose where noted
[n]If public or hospital policy does not allow for the return of subjects discharged from the hospital after COVID-19 infection for study assessments, Day 11, 15 and 21 visits may be telephone calls, and the investigator should collect as much information as possible on the health of the subject during those calls. In these instances, omission of any laboratory assessments and virology assessments that cannot be collected will not be a protocol deviation.

PK Analysis

For Part 1, blood samples for the measurement of plasma concentrations of Compound A were collected, if possible, at the following time points: Pre-dose, 1 h (within 15 minutes of the end of infusion), 4 h, 8 h, 12 h (pre-second infusion), 13 h (within 15 minutes of the end of second infusion), 16 h and 24 h (before the third infusion) after the start of the first infusion. On Days 2-7, collected daily, with a mix of trough and $C_{max}$ samples collected. On Days 2, 4 and 6, a trough sample was collected prior to administration of the $2^{nd}$ infusion of the day, and on Days 3, 5, and 7, a $C_{max}$ sample was taken 1 hour after the start of the $1^{st}$ infusion of the day (within 15 minutes of the end of the infusion). On Day 7, samples were collected 6 and 12 hours after the start of the last infusion. Trough samples were allowed to be collected within 1 hour before the administration of the $2^{nd}$ infusion of the day. A PK sample was collected at Day 21.

All plasma determination of Compound A will be analyzed using a validated liquid chromatography-tandem mass spectroscopy assay. Plasma PK parameters for each subject for will be estimated over the sampling interval using noncompartmental analysis (Phoenix WinNonlin Version 7.0 or higher, Certera), where applicable, and summarized by treatment group using descriptive statistics. Within a study part, dose proportionality will be obtained by comparing PK parameters of Compound A across evaluated dose levels. The PK parameters that will be estimated for Compound A, where possible, are listed in Table 17. Additional analyses may be conducted as appropriate.

TABLE 17

| | Definition |
|---|---|
| $AUC_{inf}$ | Area under the concentration versus time curve extrapolated to infinite time, calculated as $AUC_{0-last} + (C_{last}/\lambda_z)$ |
| $AUC_{tau}$ | Area under the concentration versus time curve over the dosing interval, tau |
| $\% AUC_{exp}$ | Percentage of AUC extrapolated between $AUC_{0-last}$ and $AUC_{0-inf}$ |
| $C_{last}$ | Last measurable concentration of drug |
| $C_{max}$ | Maximum observed concentration of drug |
| $t_{1/2}$ | Estimate of the terminal elimination half-life of the drug |

TABLE 17-continued

| | Definition |
|---|---|
| CL | CL = Dose/AUC where "Dose" is the dose of the drug and AUC = $AUC_{inf}$ after a single dose and $AUC_{tau}$ at steady state |
| $\lambda_z$ | Terminal elimination rate constant, estimate by linear regression of the terminal elimination phase of the concentration of drug versus time curve |
| $V_z$ | Volume of distribution of the drug |
| $T_{max}$ | Time of $C_{max}$ |

In all derivations of PK parameters, zero will be substituted for concentrations below the quantification limit (BQL) of the assay. Samples which are BQL, but are between 2 samples with detectable concentrations, will be excluded from PK analysis.

Virology Assessment

Samples were collected for virology studies from the lower respiratory tract (LRT; expectorated sputum or endotracheal aspirate), nasopharyngeal (NP) swab, oropharyngeal (OP) swab, and saliva pre-dose on Day 1, prior to the first maintenance dose on Days 2-7 and on Days 11, 15, and 21. The collection of LRT, NP swab, and OP swab during Part 1. Swab specimens were obtained using a cotton tipped shaft rather than the preferred nylon tipped shaft due to sourcing restrictions at study sites. In addition, NP swabs were optional during the later part of Part 1 due to high rates of subject refusal (where possible, an LRT sample was obtained, and if an LRT sample could not be obtained a saliva sample was obtained). LRT sample collection was also prohibited at several clinical sites due to institutional policy. Further, some subjects were not able to return to clinic sites after discharge and were not able to provide samples. As a result, virology samples were heterogeneous across all cohorts of Part 1.

Discharge and Follow-Up

Subjects were eligible for discharge 24 hours after dosing was complete provided the investigator approved of discharge and they met the following criteria: (i) a score on the 8-point ordinal scale of 6 (hospitalized, not requiring supplemental oxygen and no longer requiring ongoing medical care); and (ii) a NEWS of ≤2 for ≥24 hours.

All subjects (if discharged) were scheduled to return to the hospital on Days 11, 15 and 21 for the assessments noted in Table 16. If public or hospital policy did not allow for the return of subjects discharged from the hospital after COVID-19 infection for study assessments, these visits were conducted over the phone. Omission of any laboratory assessments and virology assessments that could not be collected were not considered a protocol deviation. In addition, subjects had survival and hospitalization assessments via telephone or in-clinic visits at Days 35, 49, and 56.

Statistics

For Part 1, the sample size was primarily based on feasibility to provide sufficient data to assess safety; the sample size was not powered to provide information regarding the antiviral effects of Compound A. The safety population included all randomized subjects who received any amount of study drug (i.e., a partial infusion). Subjects were analyzed according to the treatment received. This population was/will be used for all analyses of accountability, demographics, Compound A drug concentration, and safety. The PK population will include all subjects for whom any plasma PK parameters can be estimated. The intent to treat population included all subjects suspected of having COVID-19. The infected analysis population (per protocol population) included all subjects infected with confirmed COVID-19 who received any amount of study drug (i.e., a partial infusion).

Results

The primary objective of Part 1 was to evaluate the safety of Compound A. Compound A doses and predicted exposures in Part 1 were well below the NHP NOAEL. No safety concerns were identified relating to ECG, VS, or PE after Compound A dosing in Cohorts 1-3. Lab abnormalities were common across the study population in Cohorts 1-4, but no lab abnormalities were attributable to Compound A dosing. Treatment-emergent adverse events were common across the study population in Cohorts 1-4, but Compound A treated subjects (Cohorts 1-3) had lower rates of investigator-assessed treatment-related adverse events than placebo treated subjects (Cohort 4). All serious adverse events were attributable to COVID-19 and its complications.

Compound A was safe and generally well tolerated in patients infected with SARS-CoV-2. No safety signals were identified after Compound A dosing in this significantly ill hospitalized population with COVID-19. All three dose levels of Compound A administered in Cohorts 1-3 were found to be equally safe.

Part 1 was not designed or sized to demonstrate clinical efficacy of Compound A and no clinical efficacy benefit with Compound A treatment compared to placebo treatment was observed. Any potential efficacy benefit that could have been conferred by Compound A was further confounded by the disproportionately more risk factors at baseline for worse COVID-19 outcomes among the subjects in the Compound A cohorts (Cohorts 1-3) as compared to placebo subjects (Cohort 4). Table 18 describes the baseline risk factors for worse COVID-19 outcomes for the subject population of Cohorts 1-4 of Part 1.

TABLE 18

| Assignment | Male:Female (number) | Age, years (mean; median; range) | Number of CDC RFs (mean; range) | Days of Symptoms to 1$^{st}$ Dose (mean; median; range) | Ordinal Scale Score* at BL (mean; range) |
|---|---|---|---|---|---|
| Cohort 4 | 3:3 | 57; 53; 50-71 | 1.8; 1-4 | 9.5; 10; 2-14 | 3.8; 3-4 |
| Cohort 1 | 4:2 | 55; 58; 24-72 | 2.2; 1-3 | 9.2; 10; 7-10 | 3.8; 3-4 |
| Cohort 2 | 4:2 | 48; 48; 30-68 | 1.8; 0-5 | 6.5; 6; 3-12 | 4; 3-4 |
| Cohort 3 | 5:1 | 61; 66; 27-75 | 2.7; 1-5 | 11.3; 11; 9-14 | 3.3; 3-4 |

*A score of 3 is a higher level of COVID-19 disease severity than a score of 4

Figure 7:
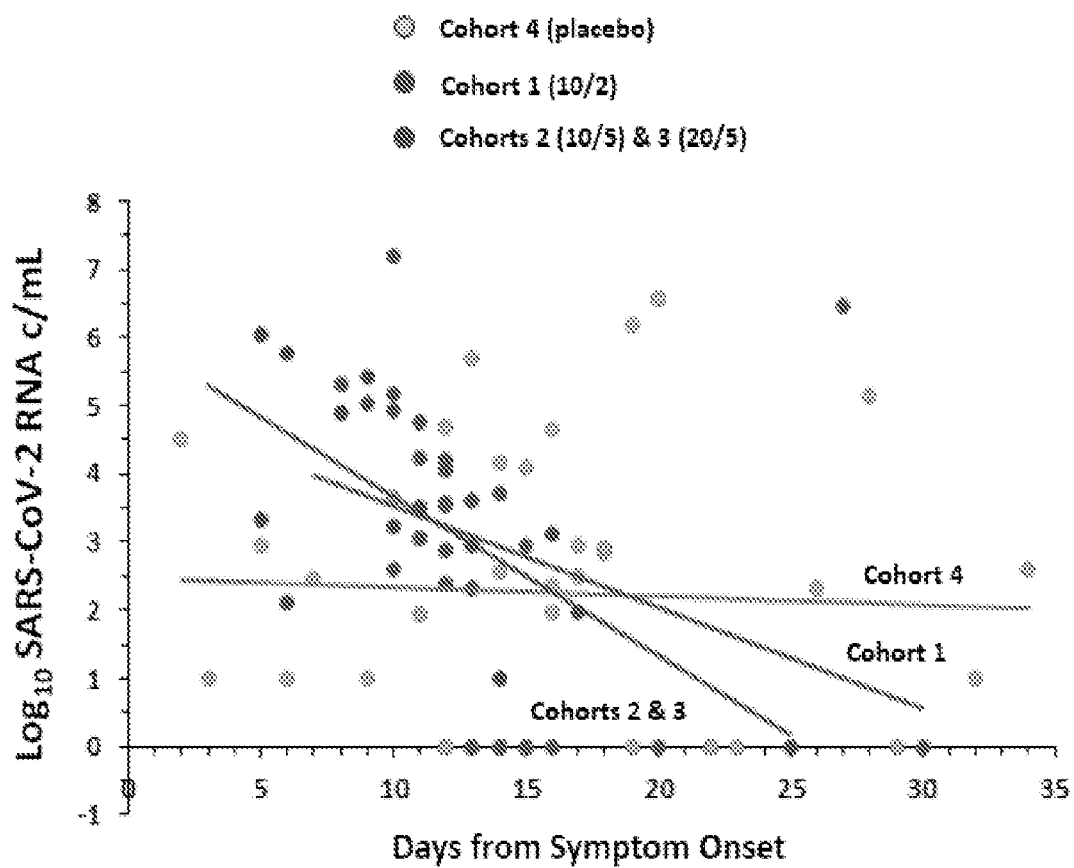
FIG. 7 shows higher doses of Compound A are associated with a shorter time to negative viral RNA result in lower respiratory tract samples as compared to placebo in hospitalized COVID-19 subjects.

Compounds A treatment was associated with a more rapid decline in viral RNA levels in the respiratory tract in an apparent dose-dependent manner. FIG. 7 shows treatment with Compound A in Cohorts 1-3 resulted in a shorter time to a negative viral RNA result in LRT samples as compared to placebo. As among Cohorts 1-3, the higher doses of Compound A administered in Cohorts 2 and 3 resulted in the shortest time to a negative viral RNA result.

Consistent with the results of the animal study described in Example 6, the virology results of Part 1 suggest that earlier antiviral treatment of SARS-CoV-2 infection with Compound A may provide a more effective antiviral response that could protect against COVID-19 disease progression.

Methods

PCR Tests

PCR tests to detect SARS-CoV-2 are currently under development and in use by many groups. Both qualitative and quantitative tests are being developed. A commonly accepted standard has yet to emerge, and test availability varies widely both within and between countries. This study will utilize the current test that is being made available to the research sites. The PCR test was used to detect SARS-CoV-2 in respiratory samples at screening (for eligibility) and daily during the hospitalization and at additional study visits as per the schedule of assessments.

Clinical Status Scales

Two scales will be used to assess clinical status, an 8-point ordinal scale and the NEWS. The 8-point ordinal scale is as follows: 1) death; 2) hospitalized, on invasive mechanical ventilation or extracorporeal membrane oxygenation (ECMO); 3) hospitalized, on non-invasive ventilation or high flow oxygen devices; 4) hospitalized, requiring supplemental oxygen; 5) hospitalized, not requiring supplemental oxygen, but requiring ongoing medical care (COVID-19 related or otherwise); 6) hospitalized, not requiring supplemental oxygen and no longer requiring ongoing medical care; 7) not hospitalized, but requiring home oxygen; 8) not hospitalized, with no requirement for home oxygen The NEWS is based on 7 clinical parameters (respiration rate, oxygen saturation, requirements for any supplemental oxygen, temperature, systolic blood pressure, heart rate, and level of consciousness).

What is claimed:

1. A method of treating a subject suffering from a SARS-COV-2 infection, the method comprising administering to the subject an effective amount of a compound of formula I,

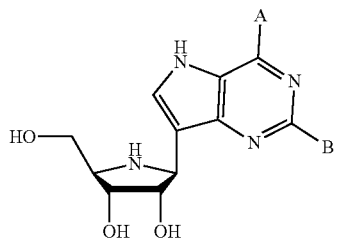

(I)

or a pharmaceutically acceptable salt, solvate, or hydrate thereof,
wherein:
A is OH or $NH_2$; and
B is H or $NH_2$;
and wherein the administering step comprises administering at least one loading dose and a plurality of maintenance doses according to a course of treatment.

2. The method of claim 1, wherein A is $NH_2$ and B is H.

3. The method of claim 2, wherein the effective amount is from 10 mg/kg/day to 14 mg/kg/day on day 1 of the course of treatment and from 2 mg/kg/day to 6 mg/kg/day on every other day of the course of treatment and the effective amount is administered as a single loading dose and the plurality of maintenance doses.

4. The method of claim 3, wherein the effective amount is administered as two doses each day.

5. The method of claim 4, wherein the effective amount is administered as the single loading dose of 8 mg/kg to 12 mg/kg as a first dose of the course of treatment, a maintenance dose of 1 mg/kg to 3 mg/kg as a second dose of the course of treatment, and as the plurality of maintenance doses of 1 mg/kg to 3 mg/kg for the remainder of the course of treatment.

6. The method of claim 4, wherein the effective amount is 12 mg/kg/day on day 1 of the course of treatment, wherein the effective amount on day 1 is administered as the single loading dose of 10 mg/kg and as the maintenance dose of 2 mg/kg, and the effective amount on every other day of the course of treatment is 4 mg/kg/day, wherein the effective amount on every other day of the course of treatment is administered as the plurality of maintenance dose of 2 mg/kg two times per day.

7. The method of claim 2, wherein the effective amount is from 13 mg/kg/day to 17 mg/kg/day on day 1 of the course of treatment and from 8 mg/kg/day to 12 mg/kg/day on every other day of the course of treatment and the effective amount is administered as a single loading dose and the plurality of maintenance doses.

8. The method of claim 7, wherein the effective amount is administered as two doses each day.

9. The method of claim 8, wherein the effective amount is administered as the single loading dose of 8 mg/kg to 12 mg/kg as a first dose of the course of treatment, a maintenance dose of 3 mg/kg to 7 mg/kg as a second dose of the course of treatment, and as the plurality of maintenance doses of 3 mg/kg to 7 mg/kg for the remainder of the course of treatment.

10. The method of claim 8, wherein the effective amount is 15 mg/kg/day on day 1 of the course of treatment, wherein the effective amount on day 1 is administered as the single loading dose of 10 mg/kg and as the maintenance dose of 5 mg/kg, and the effective amount on every other day of the course of treatment is 10 mg/kg/day, wherein the effective amount on every other day of the course of treatment is administered as the plurality of maintenance dose of 5 mg/kg.

11. The method of claim 2, wherein the effective amount is from 23 mg/kg/day to 27 mg/kg/day on day 1 of the course of treatment and from 8 mg/kg/day to 12 mg/kg/day on every other day of the course of treatment and the effective amount is administered as a single loading dose and the plurality of maintenance doses.

12. The method of claim 11, wherein the effective amount is administered as two doses each day.

13. The method of claim 12, wherein the effective amount is administered as the single loading dose of 18 mg/kg to 22 mg/kg as a first dose of the course of treatment, a maintenance dose of 3 mg/kg to 7 mg/kg as a second dose of the course of treatment, and as the plurality of maintenance doses of 3 mg/kg to 7 mg/kg for the remainder of the course of treatment.

14. The method of claim 12, wherein the effective amount is 25 mg/kg/day on day 1 of the course of treatment, wherein the effective amount on day 1 is administered as the single loading dose of 20 mg/kg and as a maintenance dose of 5 mg/kg, and the effective amount on every other day of the course of treatment is 10 mg/kg/day, wherein the effective amount on every other day of the course of treatment is administered as the plurality of maintenance dose of 5 mg/kg.

15. The method of claim 1, wherein the course of treatment is initiated after the subject has been infected with the SARS-COV-2 infection.

16. A method for reducing a viral titer of SARS-COV-2 in a bodily fluid, tissue or cell of a subject suffering from a SARS-COV-2 infection, the method comprising administering to the subject an effective amount of a compound of formula I,

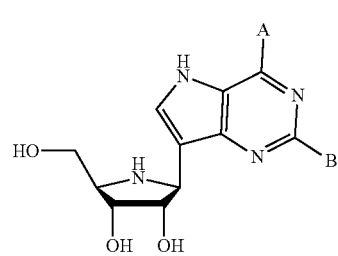

(I)

or a pharmaceutically acceptable salt, solvate, or hydrate thereof,
wherein:
A is OH or $NH_2$; and
B is H or $NH_2$;
and wherein the administering step comprises administering at least one loading dose and a plurality of maintenance doses according to a course of treatment.

17. The method of claim 16, wherein A is $NH_2$ and B is H.

18. The method of claim 17, wherein the effective amount is from 10 mg/kg/day to 14 mg/kg/day on day 1 of the course of treatment and from 2 mg/kg/day to 6 mg/kg/day on every other day of the course of treatment and the effective amount is administered as a single loading dose and the plurality of maintenance doses.

19. The method of claim 18, wherein the effective amount is administered as two doses each day.

20. The method of claim 19, wherein the effective amount is administered as the single loading dose of 8 mg/kg to 12 mg/kg as a first dose of the course of treatment, a maintenance dose of 1 mg/kg to 3 mg/kg as a second dose of the course of treatment, and as the plurality of maintenance doses of 1 mg/kg to 3 mg/kg for the remainder of the course of treatment.

21. The method of claim 19, wherein the effective amount is 12 mg/kg/day on day 1 of the course of treatment, wherein the effective amount on day 1 is administered as the single loading dose of 10 mg/kg and as the maintenance dose of 2 mg/kg, and the effective amount on every other day of the course of treatment is 4 mg/kg/day, wherein the effective amount on every other day of the course of treatment is administered as the plurality of maintenance dose of 2 mg/kg two times per day.

22. The method of claim 17, wherein the effective amount is from 13 mg/kg/day to 17 mg/kg/day on day 1 of the course of treatment and from 8 mg/kg/day to 12 mg/kg/day on every other day of the course of treatment and the effective amount is administered as a single loading dose and the plurality of maintenance doses.

23. The method of claim 22, wherein the effective amount is administered as two doses each day.

24. The method of claim 23, wherein the effective amount is administered as the single loading dose of 8 mg/kg to 12 mg/kg as a first dose of the course of treatment, a maintenance dose of 3 mg/kg to 7 mg/kg as a second dose of the course of treatment, and as the plurality of maintenance doses of 3 mg/kg to 7 mg/kg for the remainder of the course of treatment.

25. The method of claim 23, wherein the effective amount is 15 mg/kg/day on day 1 of the course of treatment, wherein the effective amount on day 1 is administered as the single loading dose of 10 mg/kg and as the maintenance dose of 5 mg/kg, and the effective amount on every other day of the course of treatment is 10 mg/kg/day, wherein the effective amount on every other day of the course of treatment is administered as the plurality of maintenance dose of 5 mg/kg.

26. The method of claim 17, wherein the effective amount is from 23 mg/kg/day to 27 mg/kg/day on day 1 of the course of treatment and from 8 mg/kg/day to 12 mg/kg/day on every other day of the course of treatment and the effective amount is administered as a single loading dose and the plurality of maintenance doses.

27. The method of claim 26, wherein the effective amount is administered as two doses each day.

28. The method of claim 27, wherein the effective amount is administered as the single loading dose of 18 mg/kg to 22 mg/kg as a first dose of the course of treatment, a maintenance dose of 3 mg/kg to 7 mg/kg as a second dose of the course of treatment, and as the plurality of maintenance doses of 3 mg/kg to 7 mg/kg for the remainder of the course of treatment.

29. The method of claim 27, wherein the effective amount is 25 mg/kg/day on day 1 of the course of treatment, wherein the effective amount on day 1 is administered as the single loading dose of 20 mg/kg and as a maintenance dose of 5 mg/kg, and the effective amount on every other day of the course of treatment is 10 mg/kg/day, wherein the effective amount on every other day of the course of treatment is administered as the plurality of maintenance dose of 5 mg/kg.

30. The method of claim 16, wherein the course of treatment is initiated after the subject has been infected with the SARS-COV-2 infection.

31. The method of claim 16, wherein the administering step is intravenous administration.

32. The method of claim 1, wherein the administering step is intravenous administration.

* * * * *